United States Patent
Atashband et al.

(10) Patent No.: US 8,423,790 B2
(45) Date of Patent: Apr. 16, 2013

(54) MODULE VALIDATION

(75) Inventors: Farshid Atashband, Carson City, NV (US); Ryan Ruppert, Reno, NV (US); Saurabh Singh, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 642 days.

(21) Appl. No.: 12/620,402

(22) Filed: Nov. 17, 2009

(65) Prior Publication Data

US 2010/0131772 A1 May 27, 2010

Related U.S. Application Data

(60) Provisional application No. 61/115,690, filed on Nov. 18, 2008.

(51) Int. Cl.
G06F 11/30 (2006.01)
G06F 12/14 (2006.01)
H04L 29/06 (2006.01)
G06F 17/30 (2006.01)

(52) U.S. Cl.
USPC ............ 713/189; 713/166; 709/225; 707/769

(58) Field of Classification Search ........................ None
See application file for complete search history.

(56) References Cited

U.S. PATENT DOCUMENTS

| | | | |
|---|---|---|---|
| 4,339,798 A | 7/1982 | Hedges et al. | 364/412 |
| 4,373,726 A | 2/1983 | Churchill et al. | 273/138 A |
| 4,592,377 A | 6/1986 | Paulsen et al. | 133/5 R |
| 4,725,079 A | 2/1988 | Koza et al. | 283/73 |
| 4,832,341 A | 5/1989 | Muller et al. | 273/139 |
| 4,948,138 A | 8/1990 | Pease et al. | 273/138 A |
| 5,083,800 A | 1/1992 | Lockton | 273/439 |
| 5,179,517 A | 1/1993 | Sarbin et al. | 364/410 |
| 5,199,710 A | 4/1993 | Lamle | 273/149 R |
| 5,258,837 A | 11/1993 | Gormley | 358/140 |
| 5,275,400 A | 1/1994 | Weingardt et al. | 273/85 CP |
| 5,321,241 A | 6/1994 | Craine | |
| 5,324,035 A | 6/1994 | Morris et al. | 273/138 A |
| 5,326,104 A | 7/1994 | Pease et al. | 273/138 A |

(Continued)

FOREIGN PATENT DOCUMENTS

DE 19940954 A1 3/2001
EP 1074955 A2 2/2001

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — Nathan Flynn
*Assistant Examiner* — Trang Doan
(74) *Attorney, Agent, or Firm* — Frank Abramonte; Fearon Brown; Marvin Hein

(57) ABSTRACT

A module validation system and methods are disclosed for use with graphical user interfaces provided by a workstation that, among other things, remotely monitor and/or control game and/or gaming devices and/or systems. Validation of modules used in shells that provide graphical user interfaces enables the module validation system to provide users with varying levels of access to a gaming system.

19 Claims, 18 Drawing Sheets

U.S. PATENT DOCUMENTS

| | | | |
|---|---|---|---|
| 5,386,103 A | 1/1995 | DeBan et al. | 235/379 |
| 5,398,932 A | 3/1995 | Eberhardt et al. | 273/138 A |
| 5,472,194 A | 12/1995 | Breeding et al. | 273/138 A |
| 5,493,613 A | 2/1996 | Denno et al. | 380/24 |
| 5,505,449 A | 4/1996 | Eberhardt et al. | 273/138 A |
| 5,507,489 A | 4/1996 | Reibel et al. | 273/138 A |
| 5,562,284 A | 10/1996 | Stevens | 273/139 |
| 5,580,311 A | 12/1996 | Haste, III | 463/29 |
| 5,605,334 A | 2/1997 | McCrea, Jr. | 273/309 |
| 5,605,506 A | 2/1997 | Hoorn et al. | 463/47 |
| 5,613,680 A | 3/1997 | Groves et al. | 273/138.2 |
| 5,613,912 A | 3/1997 | Slater | 463/25 |
| 5,643,086 A | 7/1997 | Alcorn et al. | 463/29 |
| 5,643,088 A | 7/1997 | Vaughn et al. | 463/40 |
| 5,651,548 A | 7/1997 | French et al. | 273/309 |
| 5,655,961 A | 8/1997 | Acres et al. | 463/27 |
| 5,707,287 A | 1/1998 | McCrea, Jr. | 463/27 |
| 5,735,742 A | 4/1998 | French | 463/25 |
| 5,737,418 A | 4/1998 | Saffari et al. | 380/9 |
| 5,741,183 A | 4/1998 | Acres et al. | 463/42 |
| 5,745,110 A | 4/1998 | Ertemalp | |
| 5,759,102 A | 6/1998 | Pease et al. | 463/42 |
| 5,770,533 A | 6/1998 | Franchi | 463/42 |
| 5,779,545 A | 7/1998 | Berg et al. | 463/22 |
| 5,800,268 A | 9/1998 | Molnick | 463/40 |
| 5,813,912 A | 9/1998 | Shultz | 463/25 |
| 5,823,879 A | 10/1998 | Goldberg et al. | 463/42 |
| 5,830,067 A | 11/1998 | Graves et al. | 463/40 |
| 5,830,068 A | 11/1998 | Brenner et al. | 463/42 |
| 5,850,447 A | 12/1998 | Peyret | 380/25 |
| 5,851,149 A | 12/1998 | Xidos et al. | 463/42 |
| 5,890,963 A | 4/1999 | Yen | 463/42 |
| 5,911,626 A | 6/1999 | McCrea, Jr. | 463/27 |
| 5,919,090 A | 7/1999 | Mothwurf | 463/25 |
| 5,936,527 A | 8/1999 | Isaacman et al. | 340/572.1 |
| 5,941,769 A | 8/1999 | Order | 463/12 |
| 5,957,776 A | 9/1999 | Hoehne | 463/25 |
| 5,971,851 A | 10/1999 | Pascal et al. | 463/24 |
| 5,999,808 A | 12/1999 | LaDue | 455/412 |
| 6,001,016 A | 12/1999 | Walker et al. | 463/42 |
| 6,042,150 A | 3/2000 | Daley | 283/86 |
| 6,047,322 A | 4/2000 | Vaid et al. | |
| 6,068,553 A | 5/2000 | Parker | 463/27 |
| 6,077,161 A | 6/2000 | Wisler | 463/11 |
| 6,080,063 A | 6/2000 | Khosla | 463/42 |
| 6,089,980 A | 7/2000 | Gauselmann | 463/27 |
| 6,093,103 A | 7/2000 | McCrea, Jr. | 463/27 |
| 6,102,799 A | 8/2000 | Stupak | 463/27 |
| 6,104,815 A | 8/2000 | Alcorn et al. | 380/251 |
| 6,106,396 A | 8/2000 | Alcorn et al. | 463/29 |
| 6,110,041 A | 8/2000 | Walker et al. | 463/20 |
| 6,110,043 A | 8/2000 | Olsen | 463/27 |
| 6,117,012 A | 9/2000 | McCrea, Jr. | 463/27 |
| 6,135,887 A | 10/2000 | Pease et al. | 463/42 |
| 6,146,273 A | 11/2000 | Olsen | 463/27 |
| 6,149,522 A | 11/2000 | Alcorn et al. | 463/29 |
| 6,152,824 A | 11/2000 | Rothschild et al. | 463/42 |
| 6,165,069 A | 12/2000 | Sines et al. | 463/12 |
| 6,166,763 A | 12/2000 | Rhodes et al. | 348/143 |
| 6,168,523 B1 | 1/2001 | Piechowiak et al. | 463/26 |
| 6,183,366 B1 | 2/2001 | Goldberg et al. | 463/42 |
| 6,186,892 B1 | 2/2001 | Frank et al. | 463/19 |
| 6,210,277 B1 | 4/2001 | Stefan | 463/27 |
| 6,217,447 B1 | 4/2001 | Lofink et al. | 463/12 |
| 6,219,836 B1 | 4/2001 | Wells et al. | 717/11 |
| 6,234,898 B1 | 5/2001 | Belamant et al. | 463/25 |
| 6,244,958 B1 | 6/2001 | Acres | 463/26 |
| 6,251,014 B1 | 6/2001 | Stockdale et al. | 463/16 |
| 6,254,483 B1 | 7/2001 | Acres | |
| 6,254,484 B1 | 7/2001 | McCrea, Jr. | 463/27 |
| 6,264,109 B1 | 7/2001 | Chapet et al. | 235/492 |
| 6,264,561 B1 | 7/2001 | Saffari et al. | 463/42 |
| 6,275,586 B1 | 8/2001 | Kelly | 380/46 |
| 6,287,202 B1 | 9/2001 | Pascal et al. | 463/42 |
| 6,302,793 B1 | 10/2001 | Fertitta, III et al. | |
| 6,312,332 B1 | 11/2001 | Walker et al. | |
| 6,346,044 B1 | 2/2002 | McCrea, Jr. | 463/27 |
| 6,362,836 B1 | 3/2002 | Shaw et al. | |
| 6,383,076 B1 | 5/2002 | Tiedeken | 463/40 |
| 6,389,126 B1 | 5/2002 | Bjornberg et al. | |
| 6,394,900 B1 | 5/2002 | McGlone et al. | 463/20 |
| 6,400,272 B1 | 6/2002 | Holtzman et al. | 340/572.1 |
| 6,409,602 B1 | 6/2002 | Wiltshire et al. | 463/42 |
| 6,439,996 B2 | 8/2002 | LeMay et al. | 463/29 |
| 6,443,839 B2 | 9/2002 | Stockdale et al. | 463/16 |
| 6,459,882 B1 | 10/2002 | Palermo et al. | |
| 6,460,848 B1 | 10/2002 | Soltys et al. | 273/149 R |
| 6,464,584 B2 | 10/2002 | Oliver | 463/25 |
| 6,488,581 B1 | 12/2002 | Stockdale | 463/29 |
| 6,488,585 B1 | 12/2002 | Wells et al. | 463/43 |
| 6,503,147 B1 | 1/2003 | Stockdale et al. | 463/29 |
| 6,505,772 B1 | 1/2003 | Mollett et al. | 235/379 |
| 6,508,709 B1 | 1/2003 | Karmarkar | 463/42 |
| 6,508,710 B1 | 1/2003 | Paravia et al. | 463/42 |
| 6,517,435 B2 | 2/2003 | Soltys et al. | 463/25 |
| 6,517,436 B2 | 2/2003 | Soltys et al. | 463/29 |
| 6,520,857 B2 | 2/2003 | Soltys et al. | 463/29 |
| 6,527,271 B2 | 3/2003 | Soltys et al. | 273/148 R |
| 6,527,638 B1 | 3/2003 | Walker et al. | 463/25 |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,575,829 B2 | 6/2003 | Coleman et al. | 463/20 |
| 6,575,833 B1 | 6/2003 | Stockdale | 463/29 |
| 6,578,847 B1 | 6/2003 | Hedrick et al. | 273/138.2 |
| 6,579,180 B2 | 6/2003 | Soltys et al. | 463/25 |
| 6,579,181 B2 | 6/2003 | Soltys et al. | 463/25 |
| 6,581,747 B1 | 6/2003 | Charlier et al. | 194/214 |
| 6,585,598 B2 | 7/2003 | Nguyen et al. | 463/41 |
| 6,595,857 B2 | 7/2003 | Soltys et al. | 463/29 |
| 6,607,441 B1 | 8/2003 | Acres | 463/25 |
| 6,609,978 B1 | 8/2003 | Paulsen | 463/42 |
| 6,612,928 B1 | 9/2003 | Bradford et al. | 463/29 |
| 6,628,939 B2 | 9/2003 | Paulsen | 455/414 |
| 6,629,184 B1 | 9/2003 | Berg et al. | 710/306 |
| 6,629,591 B1 | 10/2003 | Griswold et al. | 194/205 |
| 6,629,889 B2 | 10/2003 | Mothwurf | 463/25 |
| 6,638,169 B2 | 10/2003 | Wilder et al. | 463/35 |
| 6,638,170 B1 | 10/2003 | Crumby | 463/42 |
| 6,641,484 B2 | 11/2003 | Oles et al. | 463/47 |
| 6,645,077 B2 | 11/2003 | Rowe | 463/42 |
| 6,652,378 B2 | 11/2003 | Cannon et al. | 463/20 |
| 6,656,048 B2 | 12/2003 | Olsen | |
| 6,663,490 B2 | 12/2003 | Soltys et al. | 463/25 |
| 6,675,152 B1 | 1/2004 | Prasad et al. | 705/64 |
| 6,676,522 B2 | 1/2004 | Rowe et al. | 463/42 |
| 6,682,421 B1 | 1/2004 | Rowe et al. | 463/25 |
| 6,682,423 B2 | 1/2004 | Brosnan et al. | 463/29 |
| 6,685,564 B2 | 2/2004 | Oliver | 463/25 |
| 6,685,567 B2 | 2/2004 | Cockerille et al. | 463/43 |
| 6,688,979 B2 | 2/2004 | Soltys et al. | 463/25 |
| 6,699,128 B1 | 3/2004 | Beadell et al. | 463/46 |
| 6,702,291 B2 | 3/2004 | Grebler et al. | 273/292 |
| 6,702,672 B1 | 3/2004 | Angell et al. | 463/25 |
| 6,712,695 B2 | 3/2004 | Mothwurf et al. | |
| 6,712,696 B2 | 3/2004 | Soltys et al. | 463/25 |
| 6,718,361 B1 | 4/2004 | Basani et al. | |
| 6,726,099 B2 | 4/2004 | Becker et al. | 235/380 |
| 6,728,740 B2 | 4/2004 | Kelly et al. | 708/250 |
| 6,739,975 B2 | 5/2004 | Nguyen et al. | 463/39 |
| 6,743,102 B1 | 6/2004 | Fiechter et al. | 463/42 |
| 6,745,330 B1 | 6/2004 | Maillot | |
| 6,746,330 B2 | 6/2004 | Cannon | 463/25 |
| 6,752,312 B1 | 6/2004 | Chamberlain et al. | 235/375 |
| 6,755,741 B1 | 6/2004 | Rafaeli | 463/25 |
| 6,758,751 B2 | 7/2004 | Soltys et al. | 463/29 |
| 6,800,029 B2 | 10/2004 | Rowe et al. | 463/25 |
| 6,811,488 B2 | 11/2004 | Paravia et al. | 463/42 |
| 6,817,948 B2 | 11/2004 | Pascal et al. | 463/42 |
| 6,823,419 B2 | 11/2004 | Berg et al. | 710/306 |
| 6,837,789 B2 | 1/2005 | Garahi et al. | 463/29 |
| 6,846,238 B2 | 1/2005 | Wells | 463/39 |
| 6,848,994 B1 | 2/2005 | Knust et al. | 463/25 |
| 6,866,581 B2 | 3/2005 | Martinek et al. | 463/16 |
| 6,866,586 B2 | 3/2005 | Oberberger et al. | 463/42 |
| 6,884,173 B2 | 4/2005 | Gauselmann | |

| Patent No. | Date | Inventor | Class |
|---|---|---|---|
| 6,884,174 B2 | 4/2005 | Lundy et al. | 463/42 |
| 6,896,618 B2 | 5/2005 | Benoy et al. | 463/25 |
| 6,899,627 B2 | 5/2005 | Lam et al. | 463/40 |
| 6,905,411 B2 | 6/2005 | Nguyen et al. | 463/25 |
| 6,908,387 B2 | 6/2005 | Hedrick et al. | |
| 6,962,530 B2 | 11/2005 | Jackson | 463/29 |
| 6,971,956 B1 | 12/2005 | Rowe et al. | 463/25 |
| 6,972,682 B2 | 12/2005 | Lareau et al. | 340/568.1 |
| 6,993,587 B1 | 1/2006 | Basani et al. | |
| 6,997,803 B2 | 2/2006 | LeMay et al. | 463/20 |
| 7,005,985 B1 | 2/2006 | Steeves | 340/572.1 |
| 7,025,674 B2 | 4/2006 | Adams et al. | |
| 7,035,626 B1 | 4/2006 | Luciano, Jr. | 455/414.1 |
| 7,050,056 B2 | 5/2006 | Meyringer | |
| 7,062,470 B2 | 6/2006 | Prasad et al. | 705/64 |
| 7,086,947 B2 | 8/2006 | Walker et al. | |
| 7,099,035 B2 | 8/2006 | Brooks et al. | 358/1.15 |
| 7,112,138 B2 | 9/2006 | Hedrick et al. | 463/29 |
| 7,114,718 B2 | 10/2006 | Grauzer et al. | 273/149 R |
| 7,116,782 B2 | 10/2006 | Jackson et al. | 380/251 |
| 7,147,558 B2 | 12/2006 | Giobbi | 463/25 |
| 7,168,089 B2 | 1/2007 | Nguyen et al. | 726/4 |
| 7,179,170 B2 | 2/2007 | Martinek et al. | 463/29 |
| 7,186,181 B2 | 3/2007 | Rowe | 463/42 |
| 7,197,765 B2 | 3/2007 | Chan et al. | 726/8 |
| 7,198,571 B2 | 4/2007 | LeMay et al. | 463/25 |
| RE39,644 E | 5/2007 | Alcorn et al. | 380/251 |
| 7,271,727 B2 | 9/2007 | Steeves | 340/572.7 |
| 7,291,068 B2 | 11/2007 | Bryant et al. | 463/25 |
| 7,303,475 B2 | 12/2007 | Britt et al. | 463/42 |
| 7,309,065 B2 | 12/2007 | Yoseloff et al. | 273/292 |
| 7,311,605 B2 | 12/2007 | Moser | 463/25 |
| 7,329,185 B2 | 2/2008 | Conover et al. | |
| 7,330,822 B1 | 2/2008 | Robson et al. | |
| 7,331,520 B2 | 2/2008 | Silva et al. | 235/381 |
| 7,337,330 B2 | 2/2008 | Gatto et al. | |
| 7,346,682 B2 | 3/2008 | Basani et al. | |
| 7,349,920 B1 | 3/2008 | Feinberg et al. | |
| 7,351,147 B2 | 4/2008 | Stockdale et al. | 463/29 |
| 7,356,770 B1 | 4/2008 | Jackson | |
| 7,363,342 B1 | 4/2008 | Wang et al. | |
| 7,364,510 B2 | 4/2008 | Walker et al. | |
| 7,370,282 B2 | 5/2008 | Cary | |
| 7,384,339 B2 | 6/2008 | LeMay et al. | 463/30 |
| 7,398,327 B2 | 7/2008 | Lee | 709/250 |
| 7,410,422 B2 | 8/2008 | Fine | 463/42 |
| 7,419,428 B2 | 9/2008 | Rowe | 463/25 |
| 7,427,233 B2 | 9/2008 | Walker et al. | 463/16 |
| 7,427,236 B2 | 9/2008 | Kaminkow et al. | |
| 7,434,805 B2 | 10/2008 | Grauzer et al. | 273/149 R |
| 7,435,179 B1 | 10/2008 | Ford | 463/42 |
| 7,438,221 B2 | 10/2008 | Washington et al. | |
| 7,438,643 B2 | 10/2008 | Brosnan et al. | 463/42 |
| 7,455,591 B2 | 11/2008 | Nguyen | 463/42 |
| 7,460,863 B2 | 12/2008 | Steelberg et al. | 455/419 |
| 7,465,231 B2 | 12/2008 | Lewin et al. | |
| 7,473,178 B2 | 1/2009 | Boyd et al. | |
| 7,483,394 B2 | 1/2009 | Chang et al. | |
| 7,500,915 B2 | 3/2009 | Wolf et al. | 463/27 |
| 7,510,474 B2 | 3/2009 | Carter, Sr. | 463/29 |
| 7,515,718 B2 | 4/2009 | Nguyen et al. | 380/278 |
| 7,534,169 B2 | 5/2009 | Amaitis et al. | 463/39 |
| 7,549,576 B2 | 6/2009 | Alderucci et al. | 235/380 |
| 7,559,080 B2 | 7/2009 | Bhargavan et al. | 726/1 |
| 7,566,274 B2 | 7/2009 | Johnson et al. | |
| 7,575,234 B2 | 8/2009 | Soltys et al. | 273/149 R |
| 7,577,847 B2 | 8/2009 | Nguyen et al. | 713/186 |
| 7,578,739 B2 | 8/2009 | Gauselmann | 463/27 |
| 7,585,217 B2 | 9/2009 | Lutnick et al. | 463/16 |
| 7,594,030 B2 | 9/2009 | Teodosiu et al. | |
| 7,611,407 B1 | 11/2009 | Itkis et al. | 463/29 |
| 7,611,409 B2 | 11/2009 | Muir et al. | 463/29 |
| 7,617,151 B2 | 11/2009 | Rowe | 705/39 |
| 7,618,317 B2 | 11/2009 | Jackson | |
| 7,629,886 B2 | 12/2009 | Steeves | 340/572.1 |
| 7,634,550 B2 | 12/2009 | Wolber et al. | 709/220 |
| 7,637,810 B2 | 12/2009 | Amaitis et al. | 463/25 |
| 7,644,861 B2 | 1/2010 | Alderucci et al. | 235/382 |
| 7,648,414 B2 | 1/2010 | McNutt et al. | 463/25 |
| 7,674,179 B2 | 3/2010 | Baerlocher et al. | |
| 7,682,249 B2 | 3/2010 | Winans et al. | 463/31 |
| 7,684,874 B2 | 3/2010 | Schlottmann et al. | 700/9 |
| 7,685,516 B2 | 3/2010 | Fischer | |
| 7,685,593 B2 | 3/2010 | Solomon et al. | 717/170 |
| 7,686,688 B2 | 3/2010 | Friedman et al. | 463/25 |
| 7,690,995 B2 | 4/2010 | Frankulin et al. | 463/41 |
| 7,699,697 B2 | 4/2010 | Darrah et al. | 463/16 |
| 7,699,703 B2 | 4/2010 | Muir et al. | 463/29 |
| 7,702,719 B1 | 4/2010 | Betz et al. | |
| 7,722,453 B2 | 5/2010 | Lark et al. | 463/16 |
| 7,730,198 B2 | 6/2010 | Ruppert et al. | |
| 7,744,462 B2 | 6/2010 | Grav et al. | 463/27 |
| 7,747,741 B2 | 6/2010 | Basani et al. | |
| 7,753,790 B2 | 7/2010 | Nguyen et al. | 463/42 |
| 7,769,877 B2 | 8/2010 | McBride et al. | 709/230 |
| 7,778,635 B2 | 8/2010 | Crookham et al. | |
| 7,780,525 B2 | 8/2010 | Walker et al. | 463/29 |
| 7,780,526 B2 | 8/2010 | Nguyen et al. | 463/29 |
| 7,780,529 B2 | 8/2010 | Rowe et al. | |
| 7,783,881 B2 | 8/2010 | Morrow et al. | 713/165 |
| 7,785,204 B2 | 8/2010 | Wells et al. | |
| 7,824,267 B2 | 11/2010 | Cannon et al. | 463/42 |
| 7,828,649 B2 | 11/2010 | Cuddy et al. | 463/26 |
| 7,841,946 B2 | 11/2010 | Walker et al. | |
| 7,846,020 B2 | 12/2010 | Walker et al. | |
| 7,850,528 B2 | 12/2010 | Wells | |
| 7,857,702 B2 | 12/2010 | Hilbert | |
| 7,862,425 B2 | 1/2011 | Cavagna | |
| 7,874,920 B2 | 1/2011 | Hornik et al. | |
| 7,874,921 B2 | 1/2011 | Baszucki et al. | |
| 7,898,679 B2 | 3/2011 | Brack et al. | |
| 7,901,294 B2 | 3/2011 | Walker et al. | |
| 7,937,464 B2 | 5/2011 | Ruppert et al. | |
| 8,028,046 B2 | 9/2011 | Elliott et al. | |
| 8,057,297 B2 | 11/2011 | Silvestro | |
| 8,073,657 B2 | 12/2011 | Moore, III et al. | |
| 8,117,461 B2 * | 2/2012 | Bigelow et al. | 713/187 |
| 2001/0019966 A1 | 9/2001 | Idaka | 463/40 |
| 2002/0004824 A1 | 1/2002 | Cuan et al. | |
| 2002/0111213 A1 | 8/2002 | McEntee et al. | 463/42 |
| 2002/0113371 A1 | 8/2002 | Snow | 273/292 |
| 2002/0115487 A1 | 8/2002 | Wells | 463/42 |
| 2002/0142844 A1 | 10/2002 | Kerr | |
| 2002/0142846 A1 | 10/2002 | Paulsen | 463/43 |
| 2003/0004871 A1 | 1/2003 | Rowe | 705/39 |
| 2003/0032474 A1 | 2/2003 | Kaminkow | 463/25 |
| 2003/0042679 A1 | 3/2003 | Snow | 273/292 |
| 2003/0064798 A1 | 4/2003 | Grauzer et al. | 463/29 |
| 2003/0075869 A1 | 4/2003 | Breeding et al. | 273/292 |
| 2003/0078103 A1 | 4/2003 | LeMay et al. | 463/43 |
| 2003/0090064 A1 | 5/2003 | Hoyt et al. | 273/292 |
| 2003/0104865 A1 | 6/2003 | Itkis et al. | 463/39 |
| 2003/0130024 A1 | 7/2003 | Darby | 463/13 |
| 2003/0195037 A1 | 10/2003 | Vuong et al. | 463/29 |
| 2003/0203755 A1 | 10/2003 | Jackson | 463/42 |
| 2003/0206548 A1 | 11/2003 | Bannai et al. | |
| 2003/0224858 A1 | 12/2003 | Yoseloff et al. | 463/43 |
| 2003/0228912 A1 | 12/2003 | Wells et al. | 463/43 |
| 2003/0232651 A1 | 12/2003 | Huard et al. | 463/42 |
| 2004/0002386 A1 | 1/2004 | Wolfe et al. | |
| 2004/0002388 A1 | 1/2004 | Larsen et al. | |
| 2004/0029635 A1 | 2/2004 | Giobbi | 463/30 |
| 2004/0043815 A1 | 3/2004 | Kaminkow | 463/25 |
| 2004/0043820 A1 | 3/2004 | Schlottmann | 463/43 |
| 2004/0048671 A1 | 3/2004 | Rowe | 463/42 |
| 2004/0068654 A1 | 4/2004 | Cockerille et al. | 713/168 |
| 2004/0082385 A1 | 4/2004 | Silva et al. | 463/40 |
| 2004/0087375 A1 | 5/2004 | Gelinotte | 463/47 |
| 2004/0092310 A1 | 5/2004 | Brosnan et al. | 463/42 |
| 2004/0106452 A1 | 6/2004 | Nguyen et al. | 463/42 |
| 2004/0110119 A1 | 6/2004 | Riconda et al. | 434/350 |
| 2004/0127291 A1 | 7/2004 | George et al. | 463/42 |
| 2004/0133485 A1 | 7/2004 | Schoonmaker et al. | 705/30 |
| 2004/0142744 A1 | 7/2004 | Atkinson et al. | 463/29 |
| 2004/0166940 A1 | 8/2004 | Rothschild | |
| 2004/0185936 A1 | 9/2004 | Block et al. | 463/42 |
| 2004/0219982 A1 | 11/2004 | Khoo et al. | 463/42 |
| 2004/0229682 A1 | 11/2004 | Gelinotte | 463/25 |

| | | |
|---|---|---|
| 2005/0026680 A1 | 2/2005 | Gururajan .................. 463/25 |
| 2005/0043094 A1 | 2/2005 | Nguyen et al. ............... 463/42 |
| 2005/0051965 A1 | 3/2005 | Gururajan .................. 273/292 |
| 2005/0054408 A1 | 3/2005 | Steil et al. .................. 463/11 |
| 2005/0054438 A1 | 3/2005 | Rothschild et al. ........... 463/29 |
| 2005/0054445 A1 | 3/2005 | Gatto et al. |
| 2005/0070358 A1 | 3/2005 | Angell et al. ................ 463/39 |
| 2005/0080898 A1* | 4/2005 | Block ..................... 709/225 |
| 2005/0116020 A1 | 6/2005 | Smolucha et al. ........... 235/375 |
| 2005/0119052 A1 | 6/2005 | Russell et al. ............... 463/42 |
| 2005/0124411 A1 | 6/2005 | Schneider et al. ............ 463/29 |
| 2005/0153778 A1 | 7/2005 | Nelson et al. ................ 463/42 |
| 2005/0164761 A1 | 7/2005 | Tain ....................... 463/13 |
| 2005/0176507 A1 | 8/2005 | Ephrati ..................... 463/39 |
| 2005/0192099 A1 | 9/2005 | Nguyen et al. |
| 2005/0222891 A1 | 10/2005 | Chan et al. |
| 2005/0239542 A1 | 10/2005 | Olsen ...................... 463/27 |
| 2005/0282626 A1 | 12/2005 | Manfredi et al. ............. 463/25 |
| 2006/0004618 A1 | 1/2006 | Brixius ..................... 705/8 |
| 2006/0009282 A1 | 1/2006 | George et al. ............... 463/29 |
| 2006/0015716 A1 | 1/2006 | Thornton et al. |
| 2006/0019745 A1 | 1/2006 | Benbrahim ................. 463/29 |
| 2006/0026499 A1 | 2/2006 | Weddle |
| 2006/0035707 A1 | 2/2006 | Nguyen et al. ............... 463/29 |
| 2006/0035713 A1 | 2/2006 | Cockerille et al. |
| 2006/0046849 A1 | 3/2006 | Kovacs ..................... 463/39 |
| 2006/0116208 A1 | 6/2006 | Chen et al. ................. 463/43 |
| 2006/0121970 A1 | 6/2006 | Khal ....................... 463/16 |
| 2006/0183541 A1 | 8/2006 | Okada et al. ................ 463/29 |
| 2006/0195847 A1 | 8/2006 | Amano et al. |
| 2006/0196686 A1 | 9/2006 | Gatto et al. |
| 2006/0205508 A1 | 9/2006 | Green ...................... 463/40 |
| 2006/0247013 A1 | 11/2006 | Walker et al. ............... 463/20 |
| 2006/0247057 A1 | 11/2006 | Green et al. |
| 2006/0248161 A1 | 11/2006 | O'Brien et al. |
| 2006/0253702 A1* | 11/2006 | Lowell et al. ............... 713/156 |
| 2006/0277487 A1 | 12/2006 | Poulsen et al. .............. 715/772 |
| 2007/0004501 A1 | 1/2007 | Brewer et al. |
| 2007/0015583 A1 | 1/2007 | Tran ....................... 463/40 |
| 2007/0026935 A1 | 2/2007 | Wolf et al. |
| 2007/0032288 A1 | 2/2007 | Nelson et al. |
| 2007/0033247 A1 | 2/2007 | Martin |
| 2007/0054740 A1 | 3/2007 | Salls et al. ................. 463/42 |
| 2007/0057453 A1 | 3/2007 | Soltys et al. .............. 273/149 P |
| 2007/0057454 A1 | 3/2007 | Fleckenstein .............. 273/149 R |
| 2007/0057469 A1 | 3/2007 | Grauzer et al. ............. 273/309 |
| 2007/0060259 A1 | 3/2007 | Pececnik .................. 463/16 |
| 2007/0060307 A1 | 3/2007 | Mathis et al. ............... 463/25 |
| 2007/0060365 A1 | 3/2007 | Tien et al. ................. 463/42 |
| 2007/0077995 A1 | 4/2007 | Oak et al. |
| 2007/0082737 A1 | 4/2007 | Morrow et al. .............. 463/42 |
| 2007/0093298 A1 | 4/2007 | Brunet ..................... 463/42 |
| 2007/0105628 A1 | 5/2007 | Arbogast et al. |
| 2007/0111775 A1 | 5/2007 | Yoseloff ................... 463/16 |
| 2007/0111791 A1 | 5/2007 | Arbogast et al. ............. 463/40 |
| 2007/0111794 A1 | 5/2007 | Hogan et al. ............... 463/42 |
| 2007/0117608 A1 | 5/2007 | Roper et al. ................ 463/16 |
| 2007/0124483 A1 | 5/2007 | Marples et al. |
| 2007/0129145 A1 | 6/2007 | Blackburn et al. ............ 463/42 |
| 2007/0150329 A1 | 6/2007 | Brook et al. |
| 2007/0155490 A1 | 7/2007 | Phillips et al. |
| 2007/0167235 A1 | 7/2007 | Naicker .................... 463/42 |
| 2007/0191102 A1 | 8/2007 | Coliz et al. ................. 463/42 |
| 2007/0192748 A1 | 8/2007 | Martin et al. ............... 715/856 |
| 2007/0198418 A1 | 8/2007 | MacDonald et al. .......... 705/52 |
| 2007/0208816 A1 | 9/2007 | Baldwin et al. ............. 709/206 |
| 2007/0214030 A1 | 9/2007 | Shear et al. |
| 2007/0218998 A1 | 9/2007 | Arbogast et al. ............. 463/42 |
| 2007/0235521 A1 | 10/2007 | Mateen et al. .............. 235/379 |
| 2007/0241497 A1 | 10/2007 | Soltys et al. ............... 273/149 R |
| 2007/0241498 A1 | 10/2007 | Soltys ..................... 273/149 R |
| 2007/0243925 A1 | 10/2007 | LeMay et al. ............... 463/20 |
| 2007/0243927 A1 | 10/2007 | Soltys ..................... 463/25 |
| 2007/0243935 A1 | 10/2007 | Huizinga ................... 463/42 |
| 2007/0259709 A1 | 11/2007 | Kelly et al. |
| 2007/0259711 A1 | 11/2007 | Thomas .................... 463/22 |
| 2007/0287535 A1 | 12/2007 | Soltys ..................... 463/29 |
| 2007/0298868 A1 | 12/2007 | Soltys ..................... 463/25 |
| 2008/0004108 A1 | 1/2008 | Klinkhammer ............. 463/29 |
| 2008/0009344 A1 | 1/2008 | Graham et al. |
| 2008/0026832 A1 | 1/2008 | Stevens et al. |
| 2008/0026848 A1 | 1/2008 | Byng |
| 2008/0038035 A1 | 2/2008 | Shuldman et al. ............. 400/76 |
| 2008/0045341 A1 | 2/2008 | Englman |
| 2008/0064501 A1 | 3/2008 | Patel |
| 2008/0065590 A1 | 3/2008 | Castro et al. |
| 2008/0076572 A1 | 3/2008 | Nguyen et al. ............... 463/42 |
| 2008/0085772 A1 | 4/2008 | Iddings et al. |
| 2008/0090651 A1 | 4/2008 | Baerlocher ................. 463/27 |
| 2008/0096659 A1 | 4/2008 | Kreloff et al. ............... 463/39 |
| 2008/0108433 A1 | 5/2008 | DiMichele et al. |
| 2008/0113764 A1 | 5/2008 | Soltys ..................... 463/22 |
| 2008/0113773 A1 | 5/2008 | Johnson et al. ............... 463/25 |
| 2008/0113781 A1 | 5/2008 | Soltys et al. ................ 463/28 |
| 2008/0119284 A1 | 5/2008 | Luciano, Jr. et al. ........... 463/42 |
| 2008/0146337 A1 | 6/2008 | Halonen et al. .............. 463/42 |
| 2008/0153599 A1 | 6/2008 | Atashband et al. ............ 463/42 |
| 2008/0153600 A1 | 6/2008 | Swarna .................... 463/43 |
| 2008/0154916 A1 | 6/2008 | Atashband .................. 707/10 |
| 2008/0155665 A1 | 6/2008 | Ruppert et al. ............... 726/5 |
| 2008/0162729 A1 | 7/2008 | Ruppert ................... 709/249 |
| 2008/0171588 A1 | 7/2008 | Atashband .................. 463/20 |
| 2008/0171598 A1 | 7/2008 | Deng ....................... 463/40 |
| 2008/0200255 A1 | 8/2008 | Eisele ...................... 463/42 |
| 2008/0243697 A1 | 10/2008 | Irving et al. ................. 705/54 |
| 2008/0244565 A1 | 10/2008 | Levidow et al. |
| 2008/0261701 A1 | 10/2008 | Lewin et al. |
| 2008/0287197 A1 | 11/2008 | Ruppert et al. |
| 2008/0293494 A1 | 11/2008 | Adiraju et al. |
| 2008/0311971 A1 | 12/2008 | Dean ....................... 463/20 |
| 2008/0318685 A9 | 12/2008 | Oak et al. |
| 2009/0005176 A1 | 1/2009 | Morrow et al. .............. 463/43 |
| 2009/0005177 A1* | 1/2009 | Kishi et al. ................. 463/43 |
| 2009/0011833 A1 | 1/2009 | Seelig et al. |
| 2009/0029775 A1 | 1/2009 | Ruppert et al. |
| 2009/0325708 A9 | 2/2009 | Matsumura |
| 2009/0115133 A1 | 5/2009 | Kelly et al. ................. 273/274 |
| 2009/0117994 A1 | 5/2009 | Kelly et al. ................. 463/25 |
| 2009/0118001 A1 | 5/2009 | Kelly et al. ................. 463/29 |
| 2009/0118005 A1 | 5/2009 | Kelly et al. ................. 463/31 |
| 2009/0118006 A1 | 5/2009 | Kelly et al. ................. 463/31 |
| 2009/0124329 A1 | 5/2009 | Palmisano |
| 2009/0124392 A1 | 5/2009 | Ruppert et al. ............... 463/42 |
| 2009/0124394 A1 | 5/2009 | Swarna .................... 463/43 |
| 2009/0125603 A1 | 5/2009 | Atashband et al. ........... 709/207 |
| 2009/0131144 A1 | 5/2009 | Allen ....................... 463/20 |
| 2009/0131163 A1 | 5/2009 | Arbogast et al. ............. 463/29 |
| 2009/0132720 A1 | 5/2009 | Ruppert et al. .............. 709/231 |
| 2009/0170594 A1 | 7/2009 | Delaney et al. .............. 463/25 |
| 2009/0176556 A1 | 7/2009 | Gagner et al. |
| 2009/0176580 A1 | 7/2009 | Herrmann et al. |
| 2009/0181776 A1 | 7/2009 | Deng ....................... 463/42 |
| 2009/0253483 A1 | 10/2009 | Pacey et al. |
| 2009/0270170 A1 | 10/2009 | Patton ...................... 463/36 |
| 2009/0275394 A1 | 11/2009 | Young et al. ................ 463/25 |
| 2009/0275400 A1 | 11/2009 | Rehm et al. ................ 463/27 |
| 2009/0275401 A1 | 11/2009 | Allen et al. ................. 463/29 |
| 2009/0275402 A1 | 11/2009 | Backover et al. ............. 463/29 |
| 2009/0276341 A1 | 11/2009 | McMahan et al. ............ 705/30 |
| 2009/0298583 A1 | 12/2009 | Jones ...................... 463/29 |
| 2009/0307069 A1 | 12/2009 | Meyerhofer ................ 705/14.12 |
| 2010/0016067 A1 | 1/2010 | White et al. ................. 463/25 |
| 2010/0016068 A1 | 1/2010 | White et al. ................. 463/25 |
| 2010/0029385 A1 | 2/2010 | Garvey et al. |
| 2010/0048291 A1 | 2/2010 | Warkentin |
| 2010/0093441 A1 | 4/2010 | Rajaraman et al. ........... 463/42 |
| 2010/0124990 A1 | 5/2010 | Crowder ................... 463/42 |
| 2010/0125851 A1 | 5/2010 | Singh et al. ................. 718/104 |
| 2010/0130280 A1 | 5/2010 | Arezina et al. |
| 2010/0131772 A1 | 5/2010 | Atashband et al. ........... 713/189 |
| 2010/0151926 A1 | 6/2010 | Ruppert et al. |
| 2010/0161798 A1 | 6/2010 | Ruppert et al. |
| 2010/0234104 A1 | 9/2010 | Ruppert et al. .............. 463/30 |
| 2010/0248842 A1 | 9/2010 | Ruppert |
| 2011/0009184 A1 | 1/2011 | Byng |
| 2011/0009188 A1 | 1/2011 | Adiraju et al. |
| 2011/0124417 A1 | 5/2011 | Baynes et al. |
| 2012/0110649 A1* | 5/2012 | Murphy .................... 726/4 |

FOREIGN PATENT DOCUMENTS

| | | |
|---|---|---|
| EP | 1291045 A2 | 3/2003 |
| EP | 1463008 A2 | 9/2004 |
| GB | 2380143 A | 4/2003 |
| JP | 8255059 | 10/1996 |
| KR | 2001-0084838 | 9/2001 |
| KR | 2002-0061793 | 7/2002 |
| KR | 2003-0091635 | 12/2003 |
| WO | 96/03188 A1 | 2/1996 |
| WO | 96/36253 A1 | 11/1996 |
| WO | 02/05914 A1 | 1/2002 |
| WO | 03/060846 A2 | 7/2003 |
| WO | 2005/035084 | 4/2005 |
| WO | 2007/033207 A2 | 3/2007 |

OTHER PUBLICATIONS

Bally TMS, "MP21—Automated Table Tracking/Features," 2 pages, Nov. 2005.

Bally TMS, "MPBacc—Specifications/Specifications," 2 pages, Nov. 2005.

Bally TMS, "MPLite—Table Management System/Features," 2 pages, Nov. 2005.

Bulavsky, J., "Tracking the Tables," *Casino Journal*, May 2004, pp. 44-47, accessed Dec. 21, 2005, URL = http://www.ascendgaming.com/cj/vendors_manufacturers_table/Trackin916200411141AM.htm, 5 pages.

Burke, A., "Tracking the Tables," reprinted from *International Gaming & Wagering Business*, Aug. 2003, 4 pages.

Gros, R., "All You Ever Wanted to Know About Table Games," reprinted from *Global Gaming Business*, Aug. 1, 2003, 2 pages.

Hewlett Packard Handhelds, accessed Sep. 8, 2003, URL = http://www.shopping.hp.com/cgi-bin/hpdirect/shopping/scripts/home/store_access.jsp?temp . . ., 2 pages.

International Guild of Hospitality & Restaurant Managers, "Shuffle Master, Inc. (NasdaqNM:SHFL)," accessed Dec. 30, 2003, URL = http://hospitalityguide.com/Financial/Casinos/Shuffle.htm, 3 pages.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Palermo, V. "Near-field magnetic comms emerges," EE Times Design, Oct. 31, 2003.

Semtek PDA & Handheld Devices, Compaq iSwipe™ Magnetic Card Reader, accessed Sep. 8, 2003, URL = http:/www.semtek.com/products/iswipe.html, 3 pages.

Terdiman, D., "Who's Holding the Aces Now?", reprinted from *Wired News*, Aug. 18, 2003, 2 pages.

Winkler, C., "Product Spotlight: MindPlay," reprinted from *Gaming and Leisure Technology*, Fall 2003, 2 pages.

\* cited by examiner

Logging – Class Diagram

Fusion DB – Component Diagram

MODULE VALIDATION

CROSS REFERENCE TO RELATED APPLICATIONS

This application claims benefit under 35 U.S.C. 119(e) of U.S. Patent Application Ser. No. 61/115,690 filed Nov. 18, 2008 and entitled "Module Validation," which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates to validation of software modules in a software system, and in particular to module validation for ensuring the integrity of a software module in systems where modules may be provided by different groups.

2. Description of the Related Art

Software systems have been developed which use software modules to perform functions. As systems have become more complicated, different groups, sometimes within an organization and sometimes across different organizations, develop software modules for performing functions which are important to and within the competence of the group. Systems have been developed which integrate software modules from across different groups into a unified whole executable application. Such systems enable new features and functionality, maximize code reuse, improve user interface design, maximize efficiency and exploit talents and strengths of the different groups, enable collaboration among the groups, improve interoperability, and enable visual and non-visual software parts to be built, assembled, and deployed by independent teams on independent schedules.

However, in such systems, it is possible that during the integration process, one or more modules may not be in correct condition to be integrated into the whole executable application. For example, a module may have been modified, altered or tampered with. It is desirable to ensure that all modules to be integrated into the executable application are valid before integrating them into the executable application.

SUMMARY

In accordance with principles of the disclosure, software modules are validated at runtime. The validation process verifies that the software module has not been modified since it was installed in the executable application. Such a process may also enforce licensing restrictions.

A computer implemented method of providing security to a workstation having a processor and a processor-readable storage medium with a plurality of modules stored therein, the plurality of modules consisting of a first number (N, where 1<N) of modules, may be summarized as including executing a user-interface application with the processor of the workstation, the user-interface application being stored in the storage medium and having an application shell for at least a second number (M, 1<M≦N) of modules, the second number of modules consisting of modules of the plurality of modules, and the application shell providing a desktop window on a display device; and for each one of the second number of modules, retrieving a respective module of the second number of modules from the storage medium and a corresponding respective authentic module validation indicator from a database of the user-interface application, the database stored in the storage medium, calculating a respective comparison module validation indicator based at least on the retrieved respective module, comparing the comparison module validation indicator with the authentic module validation indicator, and loading the respective retrieved module in the application shell only if the comparison module validation and the authentic module validation indicator are the same.

The method may further include determining whether a first user is authorized for a respective module of the plurality of modules; and preventing the respective module from being loaded in the application shell if the first user is not authorized for the respective module. Determining whether the first user is authorized for a respective module of the plurality of modules may include receiving authentication information indicative of whether the first user is or is not authorized for the respective module from a remote server; and determining whether the first user is or is not authorized based at least on the received authentication information.

The method may further include retrieving a respective user profile from a plurality of user profiles stored in the storage medium of the workstation, the plurality of user profiles including a respective user profile of the first user and at least a respective profile of at least a second user; and determining whether the first user is authorized for a respective module of the plurality of modules based at least on the respective profile of the first user.

The method may further include, prior to retrieving a corresponding respective authentic module validation indicator, decrypting a first password stored in the storage medium, and opening a first connection to the database from which the respective authentic module validation indicator is retrieved based at least on the first password.

The method may further include associating a first password with the first user; encrypting the first password; and storing the encrypted first password in the storage medium, wherein the encrypted first password stored in the storage medium is one of a plurality of encrypted passwords, the plurality of encrypted passwords including a second encrypted password being associated with the at least second user.

The method may further include determining whether the second user is authorized for a respective module of the plurality of modules based at least on the respective profile of the second user.

The method may further include, prior to retrieving a corresponding respective authentic module validation indicator, decrypting a second password stored in the storage medium, and opening a second connection to the database from which the respective authentic module validation indicator is retrieved based at least on the second password.

A networked gaming system may be summarized as including a network; a plurality of gaming machines coupled to the network; and a workstation communicatively coupled to the plurality of gaming machines via the network, the workstation comprising at least one processor and at least one processor-readable storage medium that stores a user-interface application having an application shell, a plurality of modules for the application shell, the plurality of modules consisting of a first number (N, where 1<N) of modules, and instructions that cause the at least one processor to provide a respective graphical user interface, by: initializing the application shell for at least a second number (M, 1<M≦N) of modules in response to input from a respective user of the plurality of users, the second number of modules consisting of modules of the plurality of modules; and for each respective module of the second number of modules, determining whether a respective user of the plurality of users is authorized for the respective module of the second number of modules, determining whether the respective module of the second number of modules is valid, and loading the respective module in the application shell only if both the respective module is valid and the respective user is authorized for the respective module.

The networked gaming system wherein the at least one processor-readable storage medium stores instructions that cause the at least one processor to provide a respective graphical user interface, wherein determining whether the respective module of the second number of modules is valid includes retrieving the respective module of the second number of modules from the storage medium and a corresponding respective authentic module validation indicator from a database of the user-interface application, the database stored in the storage medium; calculating a respective comparison module validation indicator based at least on the retrieved respective module; and comparing the comparison module validation indicator with the authentic module validation indicator, wherein the respective module is valid only if the comparison module validation indicator and the authentic module validation indicator are the same.

The networked gaming system wherein the at least one processor-readable storage medium stores instructions that cause the at least one processor to provide a respective graphical user interface, wherein determining whether a respective user of the plurality of users is authorized for the respective module of the second number of modules includes receiving authentication information indicative of whether the respective user is or is not authorized for the respective module from a remote server, and determining whether the first user is or is not authorized based at least on the received authentication information.

The networked gaming system wherein the at least one processor-readable storage medium stores instructions that cause the at least one processor to provide a respective graphical user interface, further by retrieving a respective user profile from a plurality of user profiles stored in the storage medium of the workstation; and determining whether the respective user is authorized for a respective module of the plurality of modules based at least on the respective profile of the respective user.

The networked gaming system wherein the at least one processor-readable storage medium stores instructions that cause the at least one processor to provide a respective graphical user interface, further by: decrypting a password stored in the storage medium and associated with the respective user; and opening a connection to the database from which the respective authentic module validation indicator is retrieved based at least on the password.

The networked gaming system wherein the at least one processor-readable storage medium stores instructions that cause the at least one processor to provide a respective graphical user interface, further by: associating the password with the respective user; encrypting the password; and storing the encrypted password in the storage medium, wherein the encrypted password stored in the storage medium is one of a plurality of encrypted passwords, each one of the encrypted passwords being associated with another respective user.

A module validation system that validates modules used by a shell application providing a graphical user interface may include a processor-readable storage medium having a database and a plurality of modules stored therein and at least one client database having a respective authentic module validation indicator associated with a respective module included therewith; and a database module enumerator that retrieves a list of modules available for use by a respective user, and for each module in the list of modules, compares a respective comparison module validation indicator with a respective authentic module validation indicator, and loads the respective module in a shell only if the respective comparison module validation indicator and the respective authentic module validation indicator are the same. The database module enumerator may generate the respective comparison module validation indicator based at least on a respective corresponding module stored in the storage medium. The database module enumerator may generate the respective comparison module validation indicator based at least on a secure hash function.

The module validation system may further include a database installer that installs the at least one client database in the storage medium.

The module validation system may further include a module installer that installs the modules in the storage medium.

Other features and numerous advantages of the various embodiments will become apparent from the following detailed description when viewed in conjunction with the corresponding drawings.

BRIEF DESCRIPTION OF THE DRAWINGS

FIGS. 2 and 2-1 are a class diagram of a security class structure, according to one illustrated embodiment.

DETAILED DESCRIPTION OF THE PREFERRED EMBODIMENTS

Figure 1:
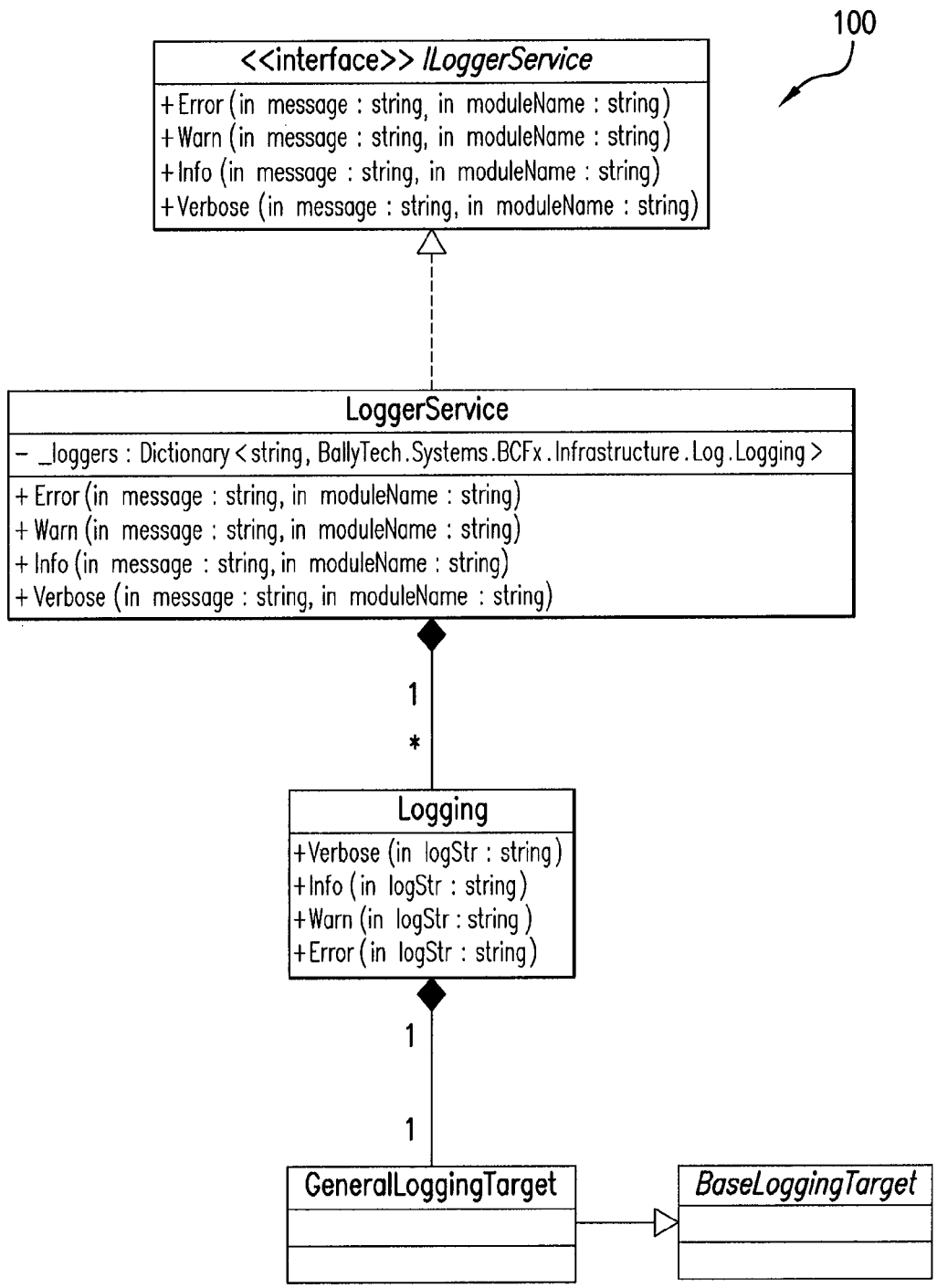
FIG. 1 is a class diagram of a logging class structure, according to one illustrated embodiment.

A software system in which embodiments may be implemented is described below.

The software system is loaded into a storage medium of a computer system such as a commercially available Bally control panel or workstation or Bally Desktop computer station, personal computer etc. The software system includes a Desktop application such as a commercially available Bally Desktop application that employs Client Framework architecture. The Desktop application and Client Framework enables the consolidation of the myriad of software products into a single User Interface (UI). It provides usability to users while creating a custom user experience depending upon the users' security role and the installed products.

The Desktop's loosely coupled and modular architecture make it easier to extend and maintain and enables new capabilities to be deployed to customers incrementally, while minimizing downtime. This modularity enables independent development and QA cycles between independent development teams.

The Desktop executable application increases productivity, quality, and the consistency of development, while reducing the overall development time by providing a central UI infrastructure, and enabling independent teams to focus on domain-specific business logic. It increases the reusability between independent teams by providing proven solutions to common client UI development challenges.

As used herein: Modular Design means the application is composed of loosely coupled parts which allows for the modular construction of the application. A UI framework is a prefabricated software infrastructure which enables this loose coupling. An Application Shell is a container that hosts user facing functionality provided by one or more Modules. Business logic is logically separated into Modules or Plug-ins based on the business logic that is implemented. Modules can be developed independently by independent teams.

The Desktop application is a UI development platform/framework that provides a consistent look and feel to Client UI screens while maximizing code reuse. The following are some of the architectural goals considered during the design of the Desktop Architecture: (a) Create reusable source-code components that provide proven solutions to common development challenges; (b) Provide a modular architecture that enables independent development cycles between development pods; (c) Deploy multiple functional UI's with a consistent look and feel; (d) Dynamically load UI elements based on user/role assignments; (e) Create a central infrastructure for security, Data Access, Logging, Web Service Interfaces, etc.; (f) Employ an infrastructure for common architecture patterns like the Model View Controller, Model View Presenter, Publish/Subscribe, or Command Pattern; (g) Enable Windows Presentation Foundation (WPF) development; (h) Provide a transition plan from Win32 forms based development to WPF; and (i) Separate the design and developer roles.

A composite pattern is developed and chosen to enable the manipulation of UI elements in a homogeneous fashion. A Smart Client—Composite UI Application Block (CAB) was developed as the composite pattern implementation starting point for the Desktop application as it provides a proven infrastructure for the composite pattern.

A Smart Client Software Factory (SCSF) is developed and chosen to help provide guidance for the Desktop application's implementation of the composite pattern. The SCSF provides a collection of reusable components, templates, wizards, architectural documentation and patterns, and implementation references. In general the SCSF provides the Desktop application with a high quality starting point for implementing the composite pattern.

Logging in the Desktop application is provided as a service. There are different levels of messages that can be logged depending on the severity of the messages. Following is the list of the severity level in descending severity order:
 1. Error
 2. Warn
 3. Info
 4. Verbose FIG. 1 shows a Logging process class structure 100, according to one illustrated embodiment. A Logger is capable of logging to an Event Recording System (ERS) database, a local File and/or an Event Viewer. The Logger may be configured to behave differently by changing the Application Config file.

The Desktop framework also provides security functions, such as authentication, authorization and module validation.

Figure 2:
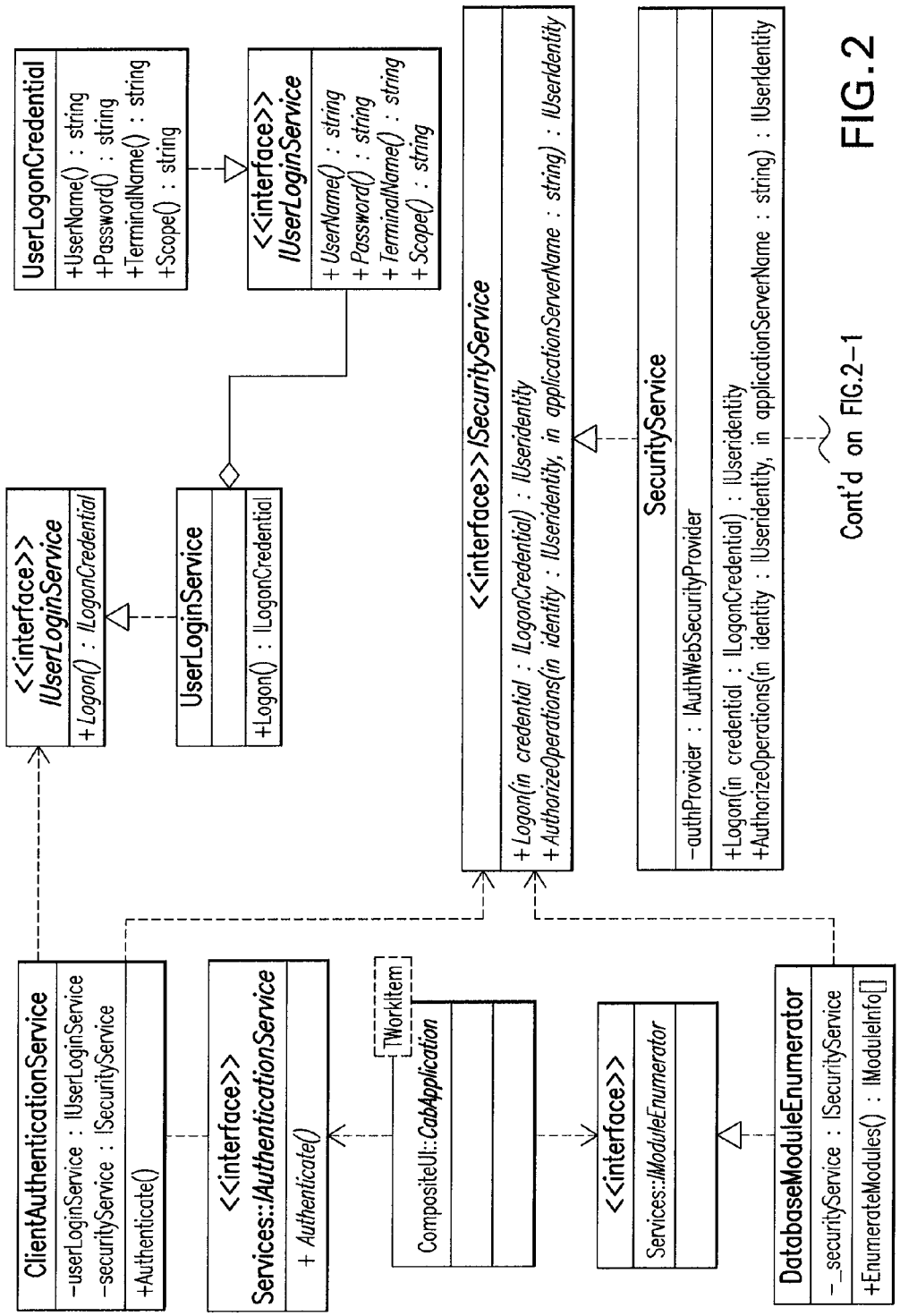
Figure 2:
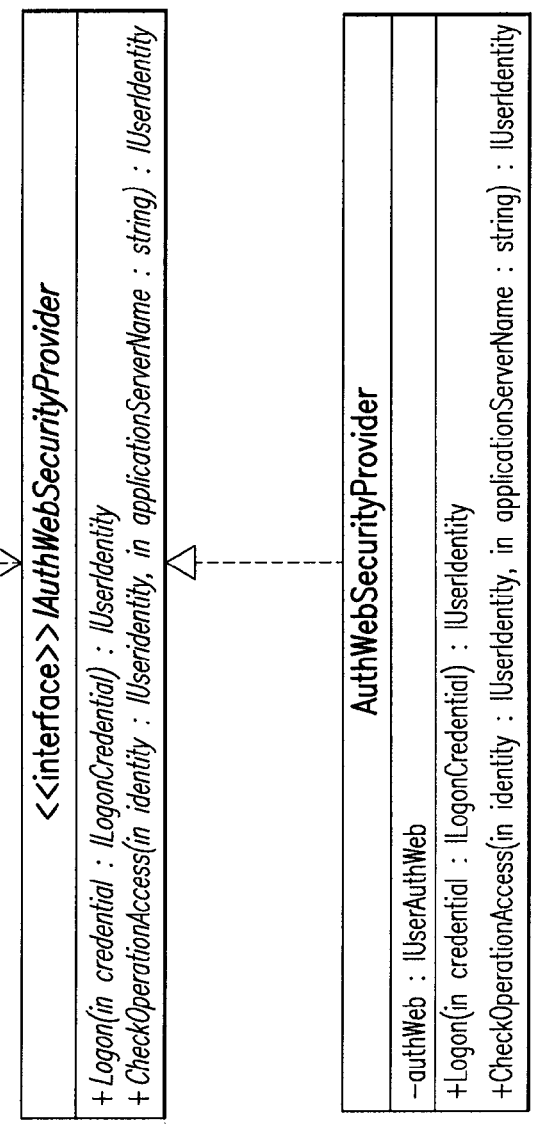
Figure 1:
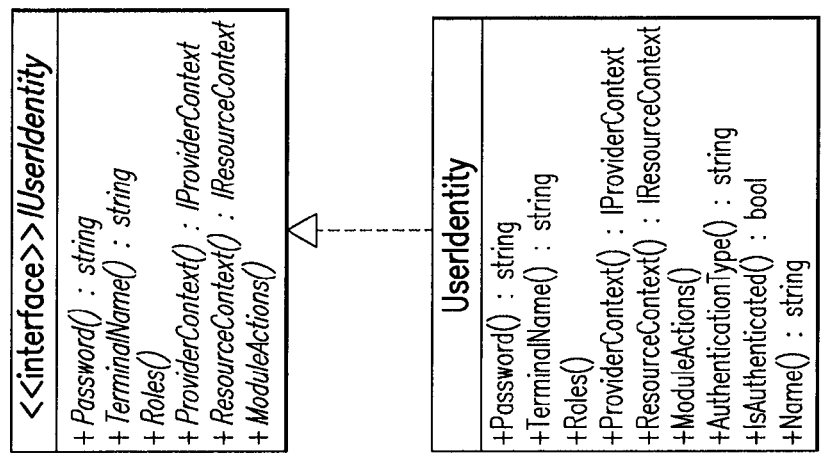

FIGS. 2 and 2-1 show a security class structure 200, according to one illustrated embodiment.

Figure 3:
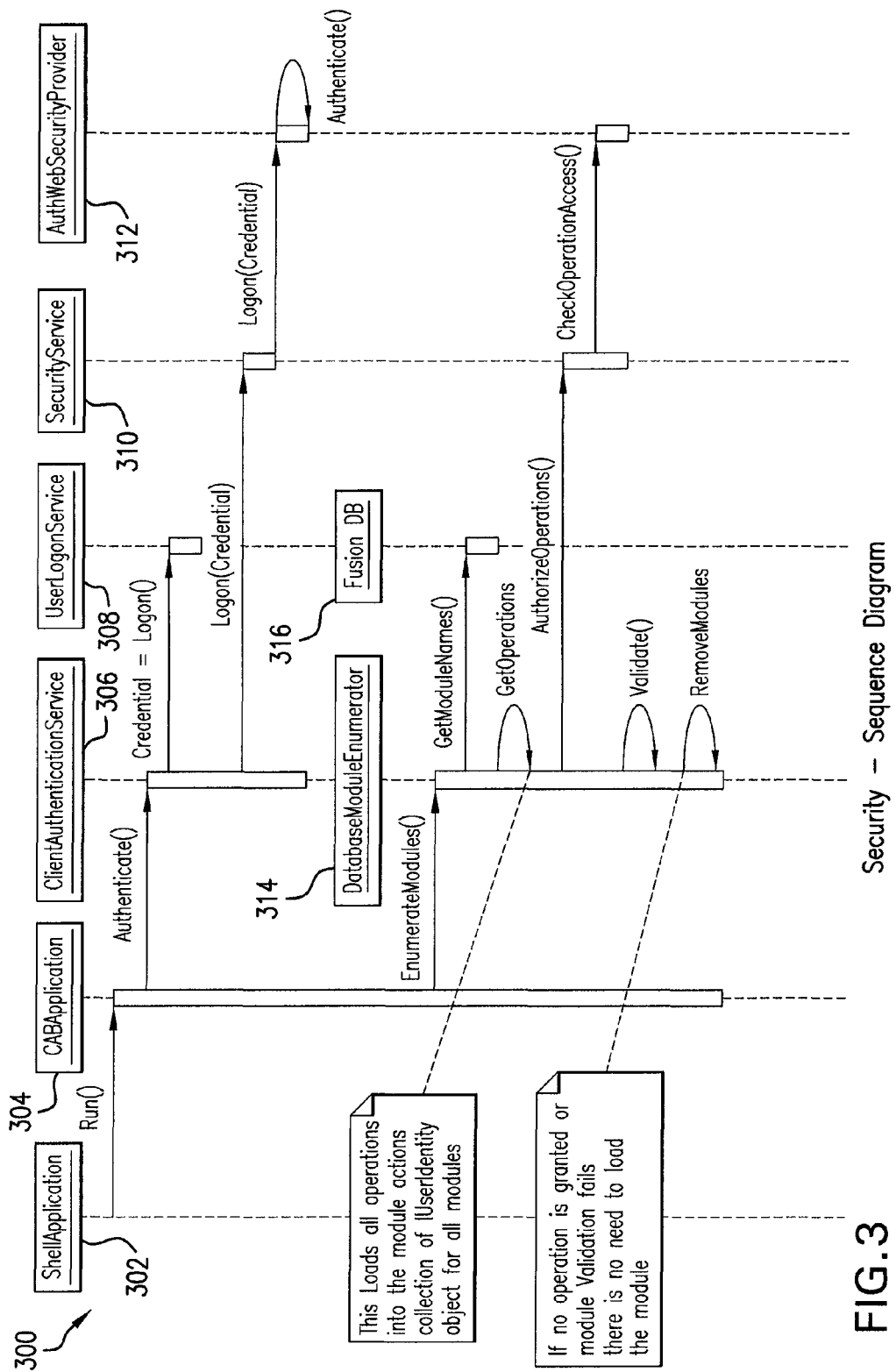
FIG. 3 is a transaction diagram of a security process, according to one illustrated embodiment.

FIG. 3 shows a transaction diagram of a security process 300 in a Desktop application, according to one illustrated embodiment. As a shell application 302 is run or initiated, the shell application 302 runs a Composite UI Application Block (CAB) application 304. The CAB application 304 calls an authenticate method implemented by the ClientAuthenticationService 306. The ClientAuthenticationService 306 provides a UserLogonService 308, which displays a Login dialog to the user. The user enters his credentials, such as user name and password. The credentials are now sent to a SecurityProvider Service 310, which in turn sends it to an AuthWeb Security Service 312 for authentication.

In some embodiments, the AuthWeb Security Service 312 may be implemented by a remote computing system or server.

If the authentication fails then the user is informed and the Login dialog reappears. If the user credentials are authenticated then an EnumerateModules method of DatabaseModuleEnumerator 314 is called, which fetches the respective names of the modules to be loaded from a local Desktop Database 316. The user operations corresponding to each module that needs to be loaded are added, and the operations that are permitted for the current user are authorized. The ClientAuthenticationService 306 may call the SecurityProvider Service 310, which may in turn call the AuthWeb Security Service 312 for authorization of the current user for each one or selected ones of the modules. Based on the permitted operations, a decision is made whether a respective module will be loaded or not for some or all of the fetched modules. Below are two conditions under which a module is not loaded:
 1. If a user has no operation permission on a given module.
 2. If a validation check fails. This is described in more detail below.

Discussed below is an exemplary method for preventing unauthorized users from accessing the database 316.

Figure 4:
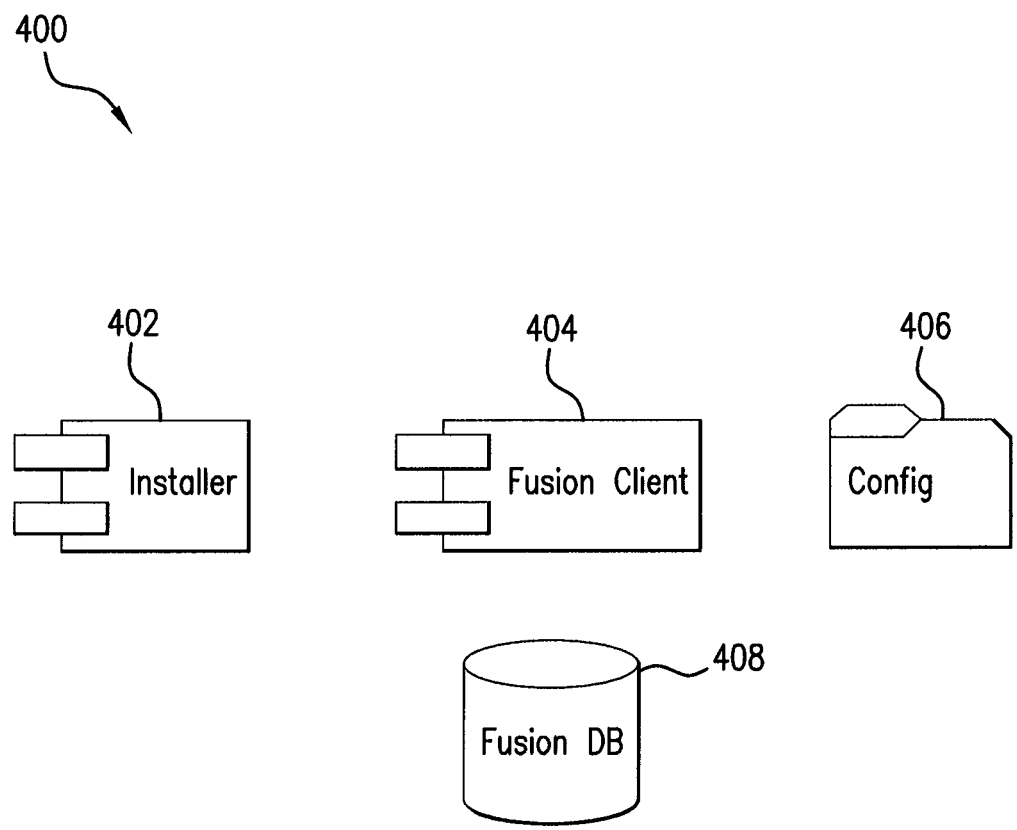
FIG. 4 is a schematic diagram of a system having an installer application and a Desktop application, according to one illustrated embodiment.

FIG. 4 is a schematic diagram of a system 400 having an installer 402 and components of a Desktop application, according to one illustrated embodiment. The Desktop application includes a client application 404, at least one client configuration file 406 and at least one client database 408. The client application 404, the client configuration file 406 and the client database 408 are stored in a storage medium of a user's workstation. The installer 402 is an application that installs the Desktop application on the user's workstation (not shown). The installer 402 is a separate program from the Bally Desktop Client. The Installer 402 is responsible for creating the application database 408 and its assets.

The client database 408 may be a local database which may be used by the Desktop application and/or Desktop application components, e.g., client application 404 to store and retrieve data.

Figure 5:
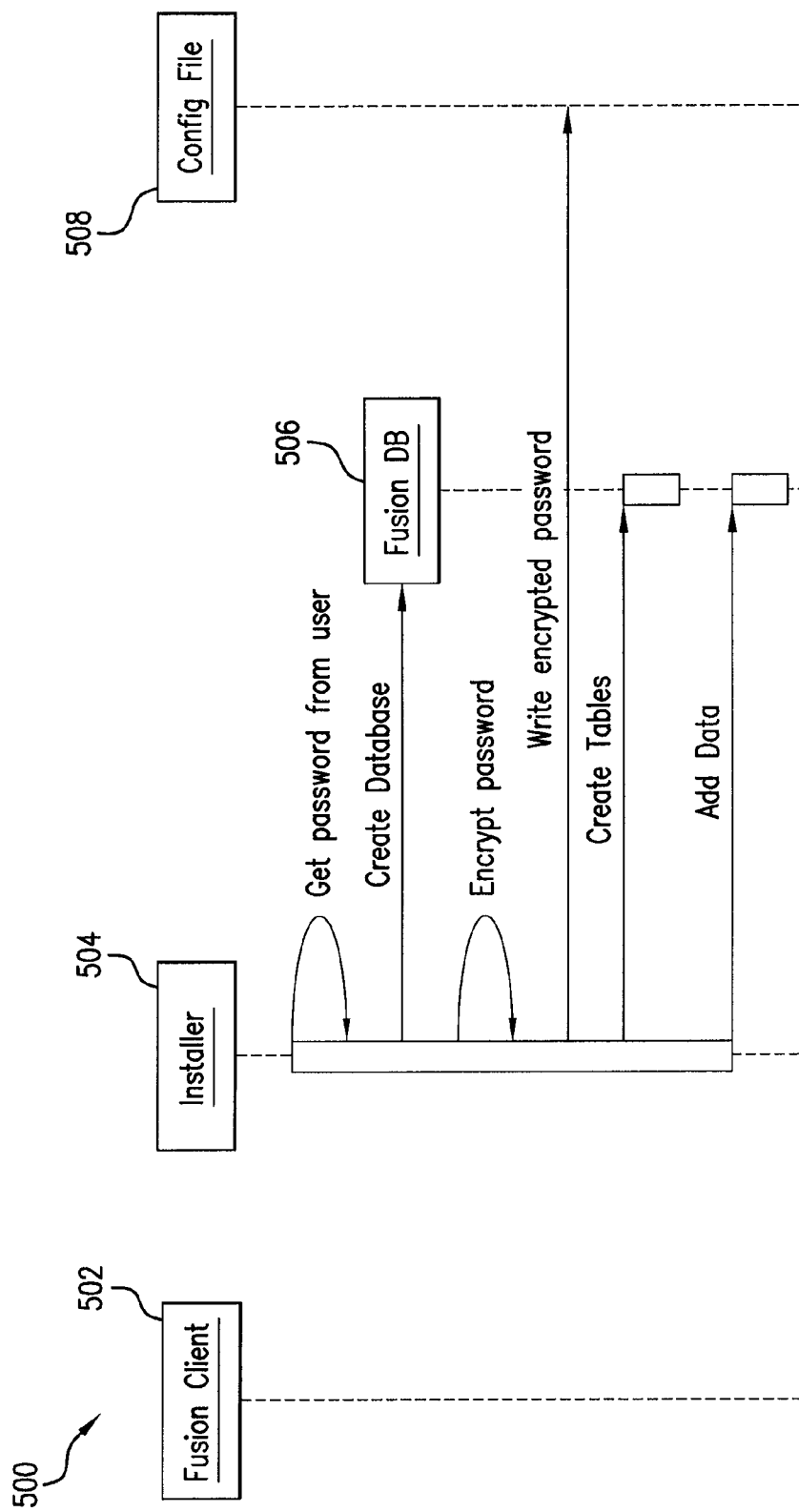
FIG. 5 is a transaction diagram of a database creation process, according to one illustrated embodiment.

FIG. 5 is a transaction diagram of a database creation process 500, according to one illustrated embodiment. An installer 502 installs a client application 504. The client application 504 may be one or more portions of the Desktop application and/or the Desktop application. The client application 504 may be an update to one or more portions of the Desktop application and/or an update to the Desktop application.

The installer 502 gets a user to provide a password. The password may be different from a password to logon to the user's workstation. The installer 502 creates a client database 506 for the client application 504. The installer 502 may create the client database 506 based at least on the password.

The installer 502 may create a client configuration file 508, and may encrypt the password and write the encrypted password to the client configuration file 508 file. This encrypted password is used by a Desktop Client application to connect to database 506. The installer 502 creates tables in the database 506 and adds the appropriate data to them. The installer 502 may store a key used to encrypt the password in the client database 506.

Figure 6:
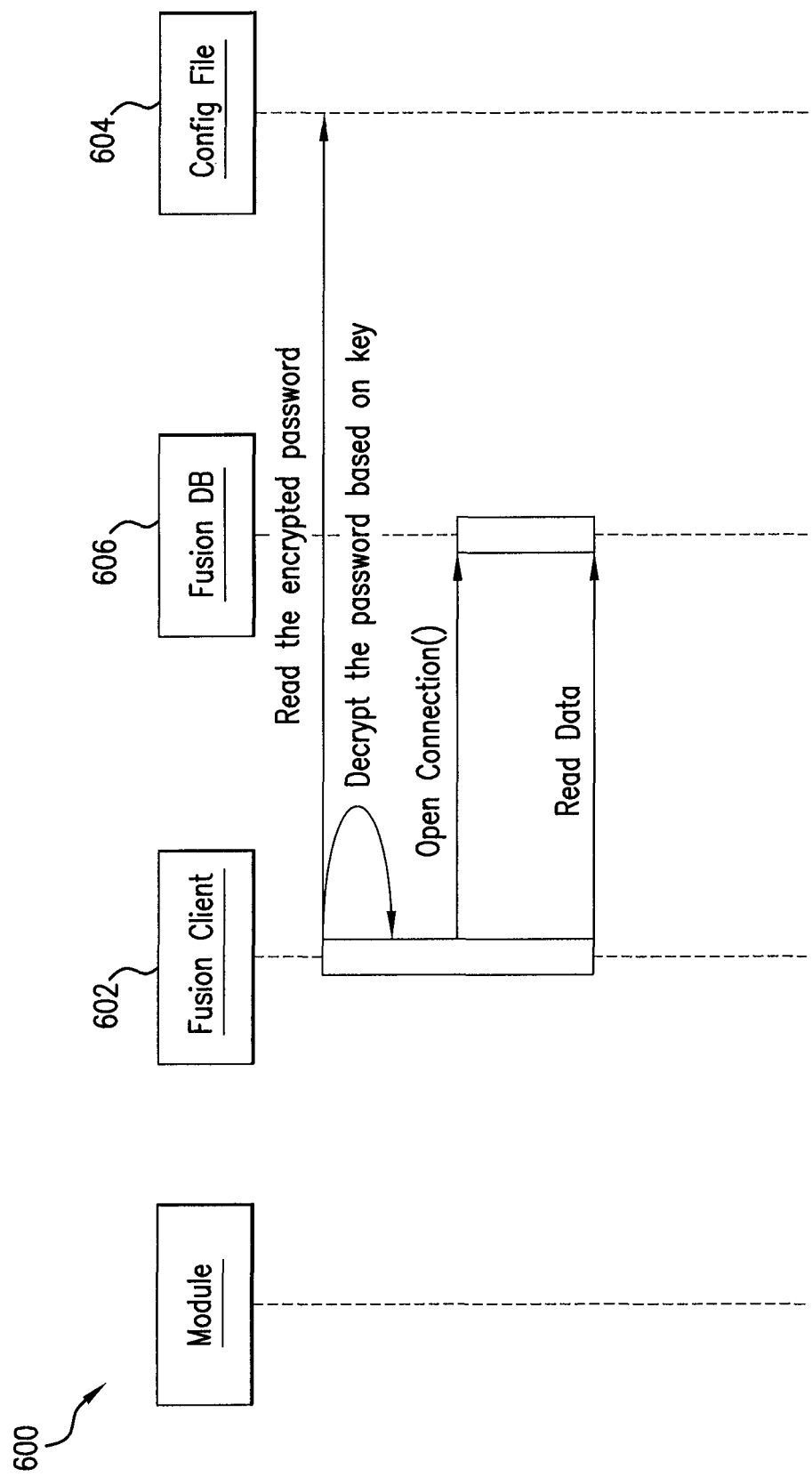
FIG. 6 is a transaction diagram of a Data Retrieval process from a database, according to one illustrated embodiment.

FIG. 6 is a transaction diagram of a data retrieval process 600, according to one illustrated embodiment. A client application 602 such as a Desktop Client, reads an encrypted password from a configuration (config) file 604, and based on a key stored with the client application such as a Desktop Client, the client application 602 decrypts the password. The key may be stored in a client database 606. The client application 602 may use this password to open a connection with the client database 606 and start reading data. Among other things, the retrieved data may include module validation indicators, which are indicative of a module being valid. Module validation indicators may be stored in client database 606 in encrypted form.

Figure 7:
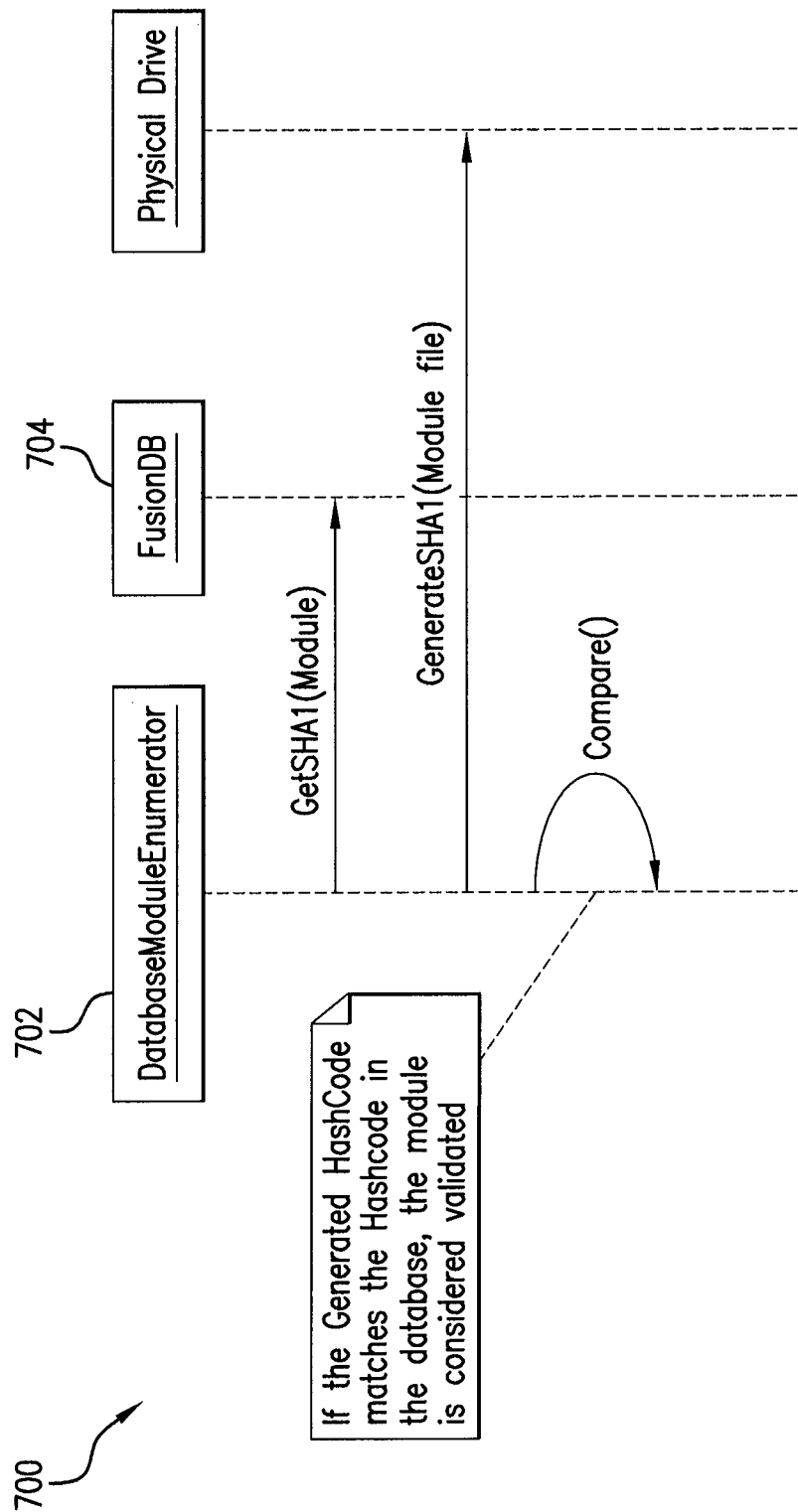
FIG. 7 is a transaction diagram of a validation process, according to one illustrated embodiment.

FIG. 7 is a transaction diagram of a validation process 700, according to one illustrated embodiment. A validator application 702 such as DatabaseModuleEnumerator validates the module by retrieving an authentic module validation indicator for the module from a client application database 704 such as a Desktop Client. The authentic module validation indicator may be stored in the client application database 704 as part of an installation or updating process. The authentic module validation indicator may be, among other things, a hash value. The validator application 702 may calculate a comparison module validation indicator (using Secure Hash Algorithm 1 (SHA1)) of the assembly file (corresponding to the module) in a storage medium 706 of the user's workstation. The validator application 702 may compare the comparison module validation indicator with the authentic module validation indicator retrieved from the database 704. If these values match, then the module is considered validated. If the values don't match, then the module is considered not validated. If not validated, the module is not loaded into the client application, such as a Desktop Client.

Figure 8:
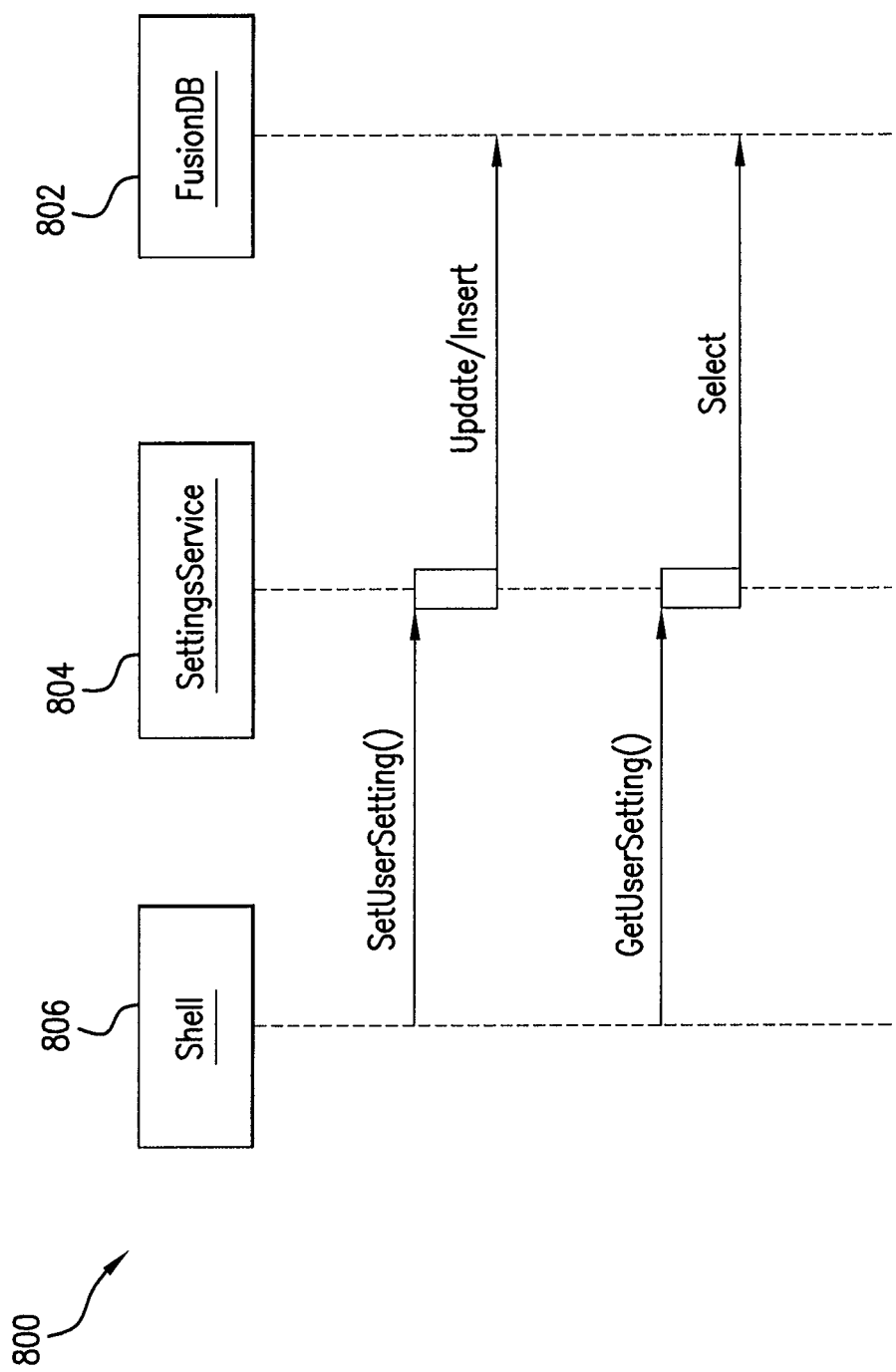
FIG. 8 is a transaction diagram of a process for storing and retrieving user profiles, according to one illustrated embodiment.

FIG. 8 is a transaction diagram of a storing and retrieving process 800. Profile settings in the Desktop application are stored in a local database 802 by a shell application 804. The shell application 804 calls a SettingService 806 for storing the settings. Two types of settings may be saved: User Settings and Application Settings. User Settings are settings that may be saved for a user of a module. Every user setting has a user and a module associated with it. Application Settings are settings which apply to a module, and therefore, such settings have a module associated with them, but not a user. A 'getter' and a 'setter' function are provided for both types of settings. The behavior of the 'setter' function is such that, if a user tries to set a setting which does not exist, the setting is created.

Figure 9:
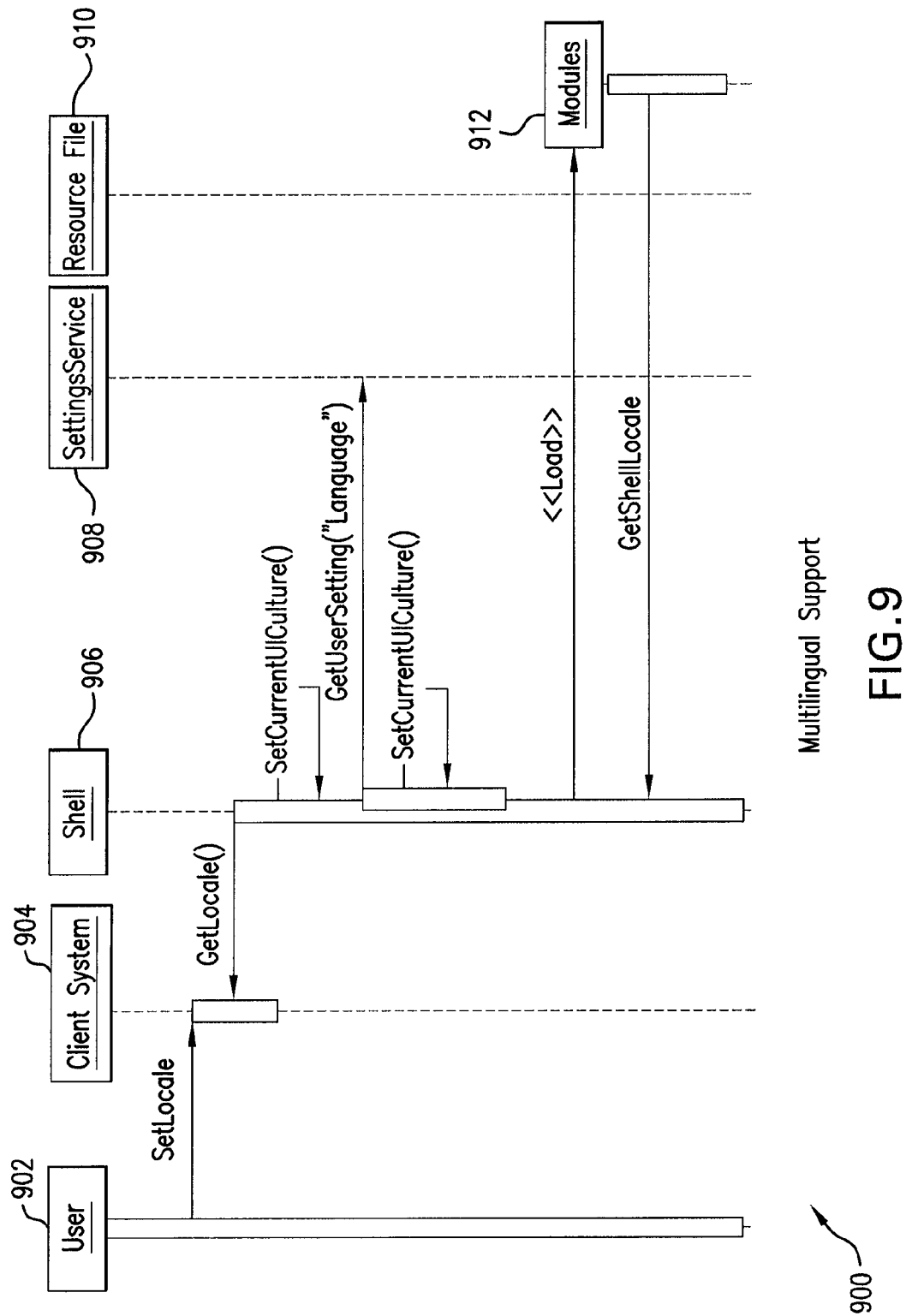
FIG. 9 is a transaction diagram of a Multilanguage provisioning process, according to one illustrated embodiment.

FIG. 9 is a transaction diagram of a Multilanguage provisioning process 900, according to one illustrated embodiment. A user sets "Regional Settings" via a Client System 904 to a desired Locale. The Client System 904 may provide a control panel for the user to set the "Regional Settings." An exemplary control panel is a commercially available Bally control panel provided by a Bally Desktop application. When a shell 906 is initialized, the shell retrieves an initial locale indicator from the operating system (OS). The shell 906 calls a SettingsService 908 and sets a CurrentCulture and a CurrentUICulture of a Current Thread. The localization (CurrentUICulture) is also set to the Locale of the client system 904. As a user logs in, the Desktop application searches the database for any localization override for the user. If an override is found, a language specified in the override data is set as the localization for this user. If an override is not found, the Desktop application continues to operate with the current settings. The Shell 906 reads a resource File 910 corresponding to the CurrentUICulture and gets all the appropriate resources and populates the UI. As the shell 906 starts loading modules 912, a respective module detects the shell's locale data and the respective module sets its Locale accordingly.

A Status Bar is added to the RootWorkItem's UIExtensionSite. A status panel is added to this status bar which is shared by all the modules and the Shell. This status panel is also added to the RootWorkItem's Item collection (to facilitate the retrieval of the object in different modules). Each view generated by the Desktop SCSF Guidance package provides a way to add a message to the status bar. Every view also has a state variable to hold the last displayed message by the view, which facilitates the framework to show status messages relevant to the view in context.

Figure 10:
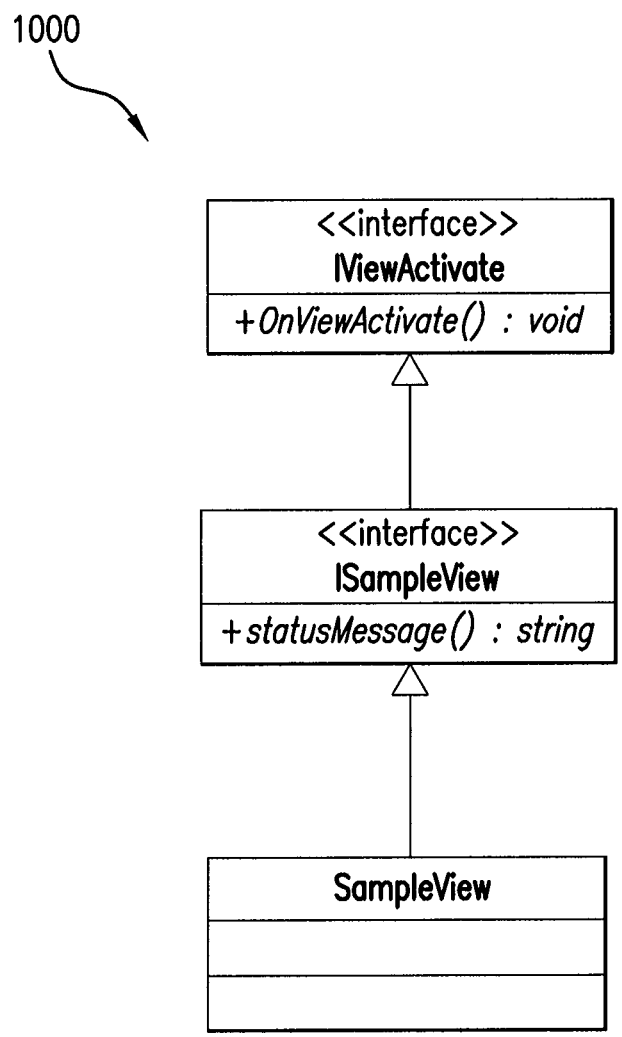
FIG. 10 is a class diagram of a Status Bar functionality, according to one illustrated embodiment.
Figure 11:
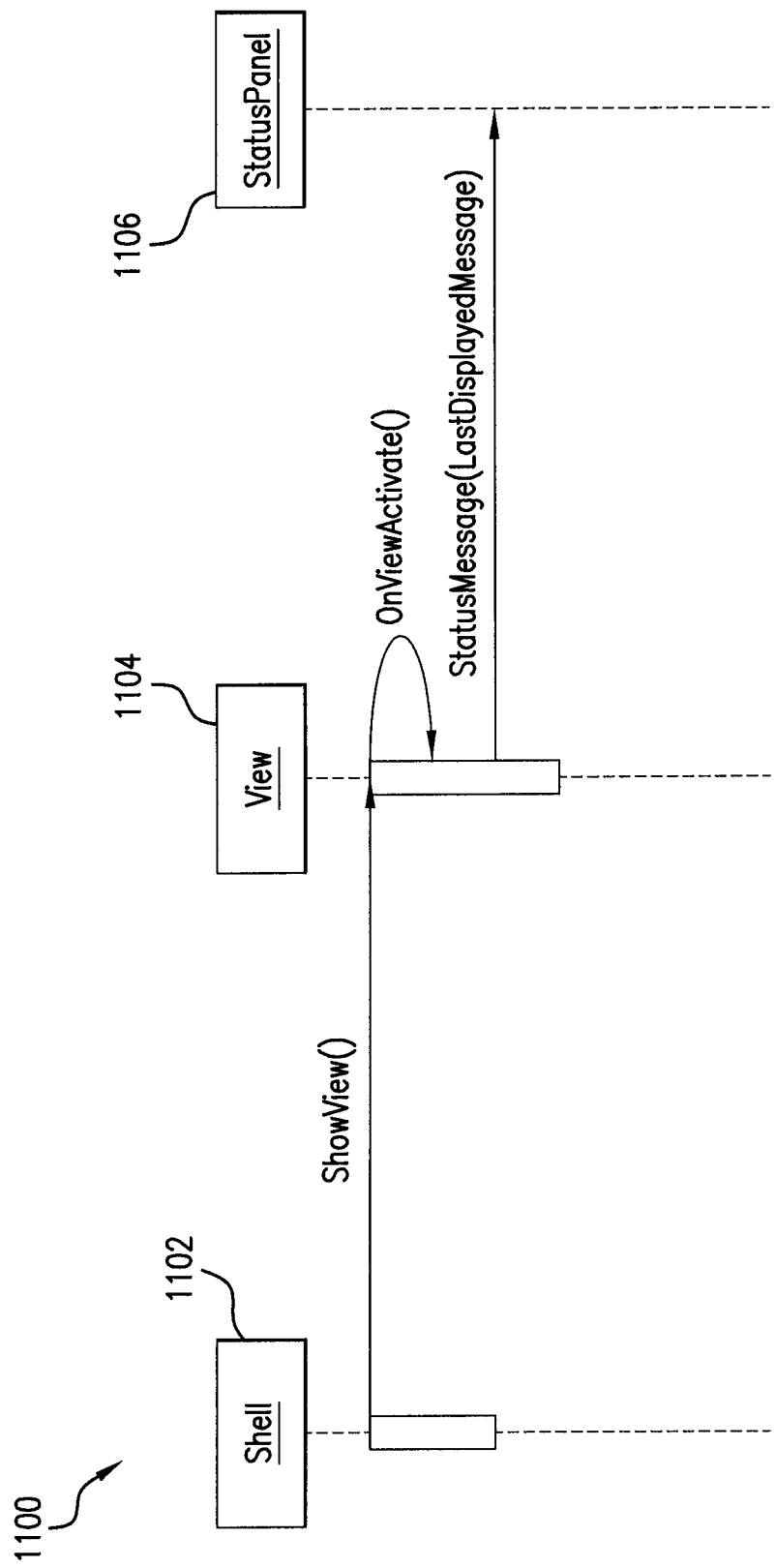
FIG. 11 is a transaction diagram of a Status Bar functionality order, according to one illustrated embodiment.

FIG. 10 is a class diagram of a Status Bar functionality 1000 and FIG. 11 is a transaction diagram of Status Bar functionality order 1100. In FIGS. 10 and 11, a framework is modified such that every time a view is shown in a workspace such as in a control panel or a window provided by a user interface. Referring to FIG. 11, a shell 1102 calls a View 1104. The View 1104 calls a StatusPanel 1106, which may employ a method OnViewActivate( ).

In one embodiment, all views generated by a Desktop SCSF package implement an IViewActivate interface. A Desktop SCSF Guidance package also implements this function in a Generated View class where the Desktop SCSF Guidance package loads the Last Displayed Message by the View to the Status Bar.

Figure 12:
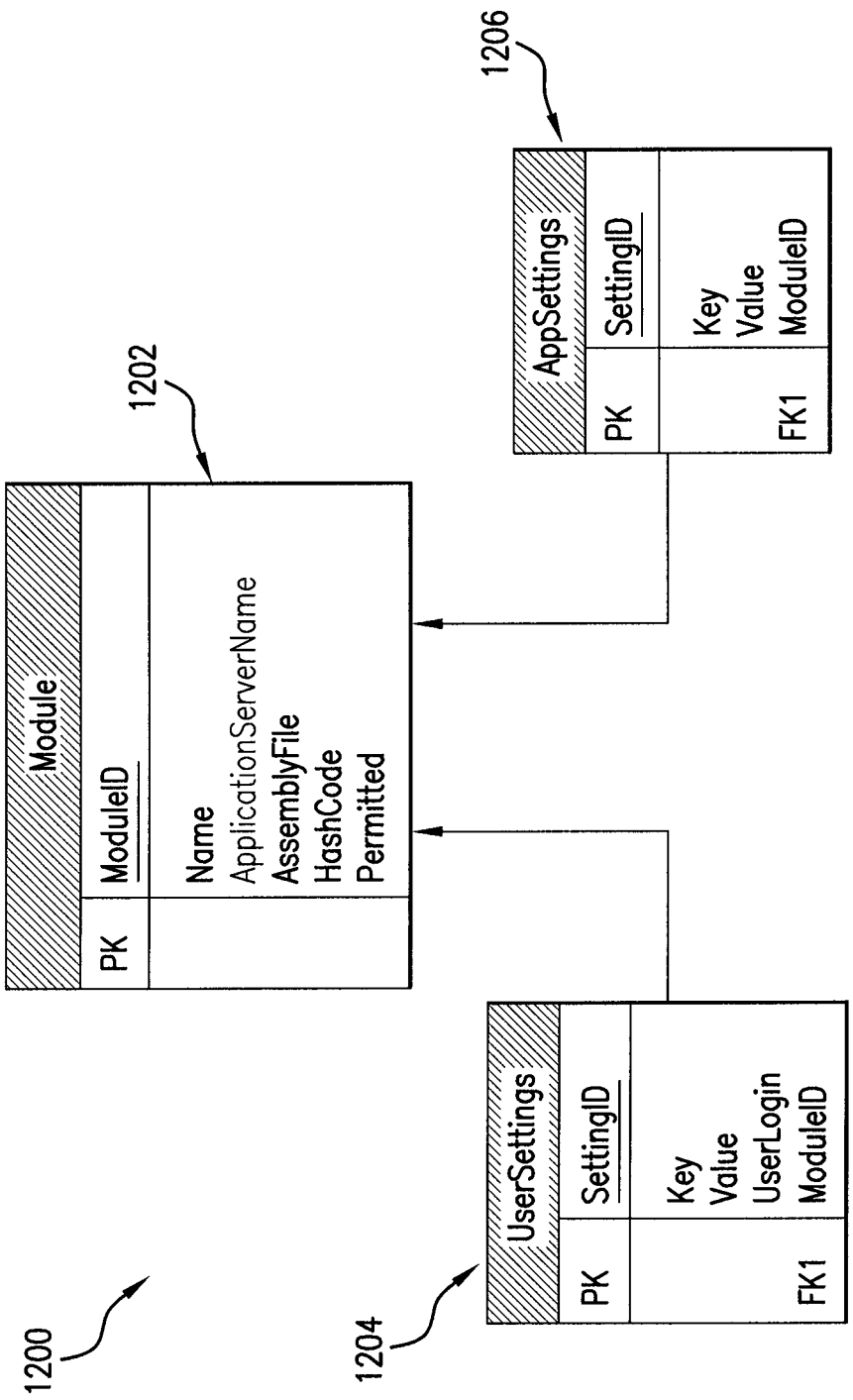
FIG. 12 is a schematic diagram of a database schema, according to one illustrated embodiment.

FIG. 12 is a schematic diagram of a database schema 1200, according to one illustrated embodiment. The database schema 1200 may be employed by the client database 408 (see FIG. 4). The database schema 1200 includes three tables. A first table, Module table 1202, which includes columns containing data representing each module. Illustrated columns include ModuleID; Name; ApplicationServerName; AssemblyFile; HashCode and a Permitted flag. A second table, UserSettings table 1204, includes columns containing data representing user settings. Illustrated columns include SettingID, Key, Value, UserLogin, and ModuleID. A third table, AppSettings table 1206, includes columns containing data representing application settings. Illustrated columns include SettingID, Key, Value, and ModuleID. One skilled in the art understands that other tables may be defined and used by the system, and that other columns may be defined for the tables illustrated in FIG. 12. The UserSettings table 1206 includes settings that may be saved for a user of a module. The AppSettings table 1206 includes settings which apply to a module and which do not apply to a user.

Figure 13:
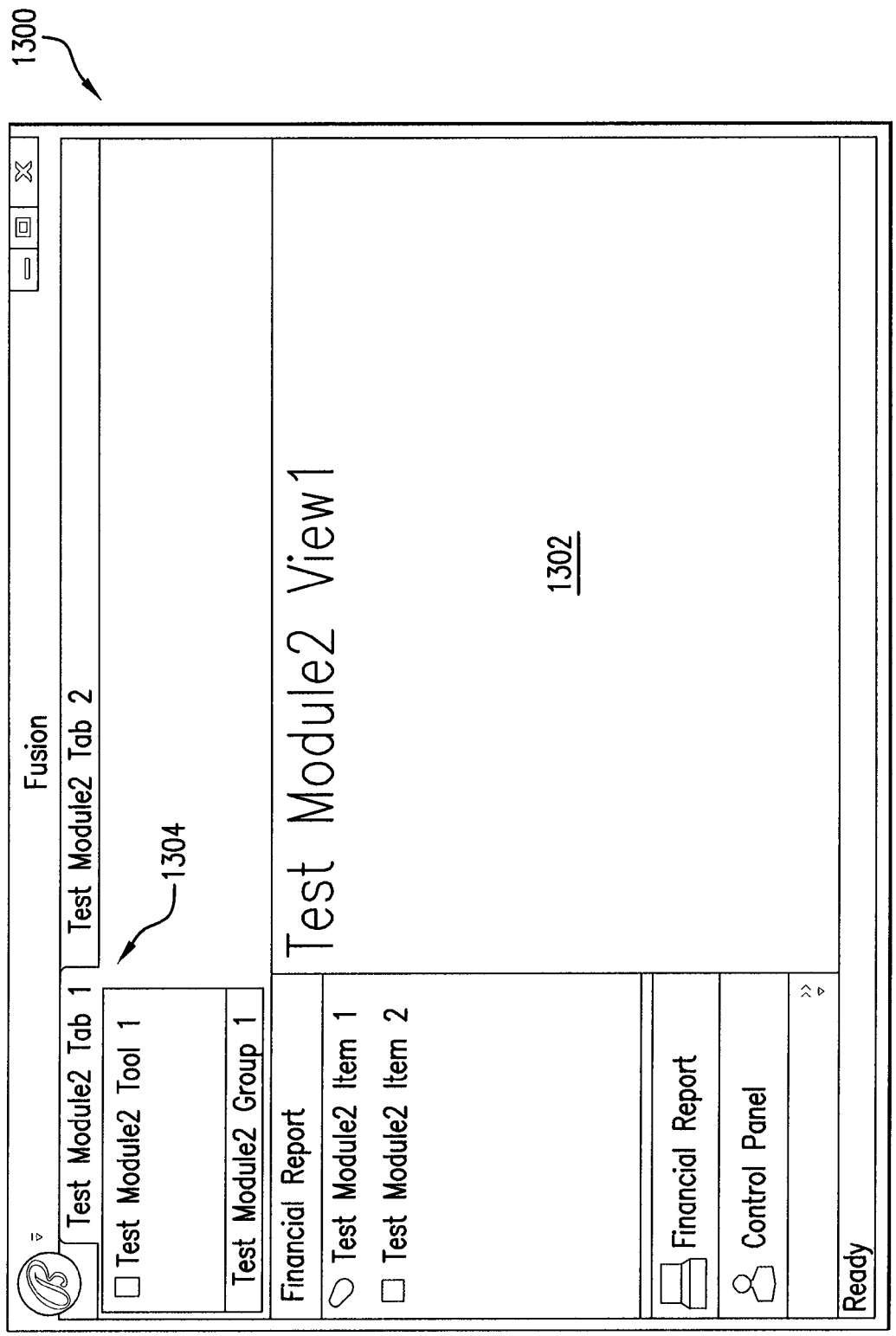
FIG. 13 is a screen print showing a top level window or screen of a graphical user interface, according to one illustrated embodiment.
Figure 14:
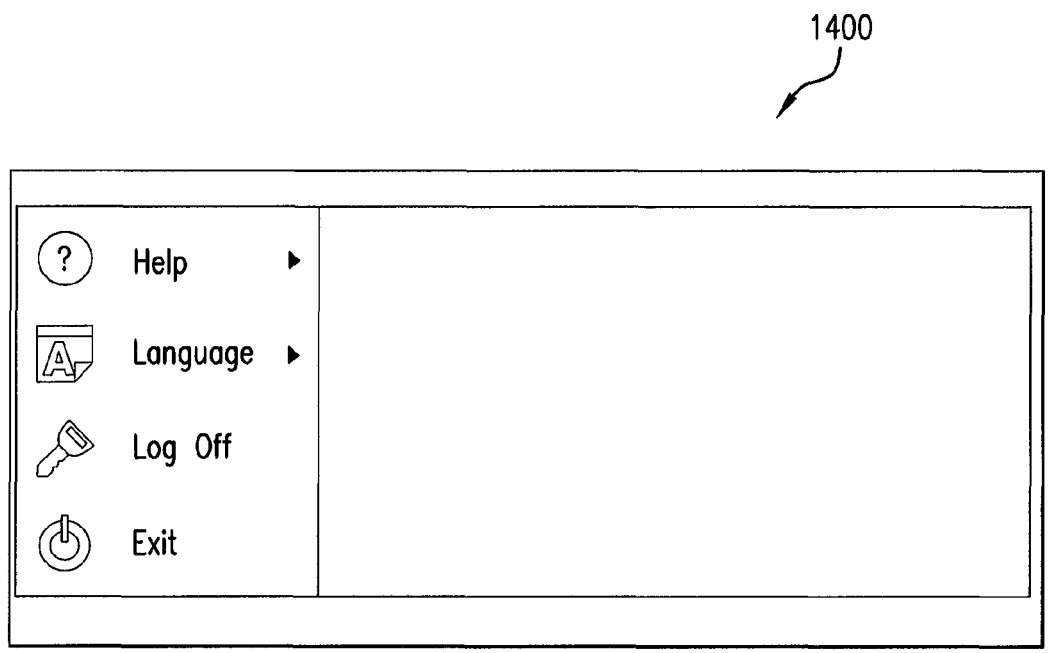
FIG. 14 is a screen print showing a window or screen of a graphical user interface for a user to specify user settings, according to one illustrated embodiment.
Figure 15:
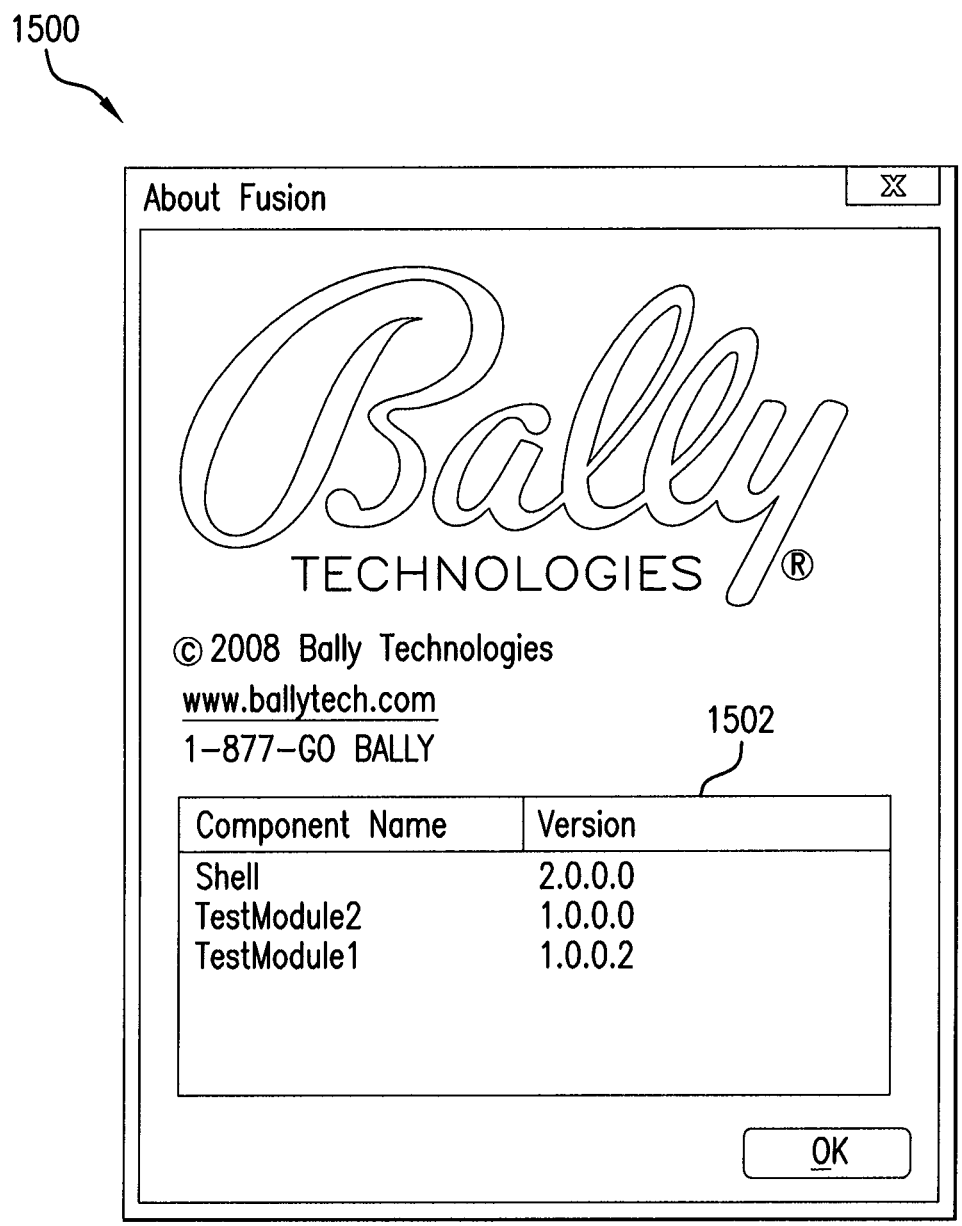
FIG. 15 is a screen print showing a window or screen of a graphical user interface for providing information about an executable application, according to one illustrated embodiment.

FIGS. 13 through 15 are respective screen prints of graphical user interface (GUI) windows generated and used by a system for interacting with a user.

Referring to FIG. 13, a top level window or screen 300 of a graphical user interface (GUI) is shown. The window 1300 is generated by a module. In FIG. 13, a Test Module 2 generates a View1 view 1302 or a subwindow of window 1300. A tabbed interface 1304 enables a user to select a first tab entitled "Test Module2 Tab 1," which provides the illustrated view, or a second tab entitled "Test Module2 Tab 2," which provides a different view (not shown). A task bar may also provide another interface that enables a user to select various views.

FIG. 14 is a screen print showing window or screen 1400 of a graphical user interface for a user to specify user settings, according to one illustrated embodiment. Referring to FIG. 14, a user may use screen 1400 to specify user settings such as language and for allowing a user to ask for help, log off, or exit the executable application.

FIG. 15 is a screen print showing window or screen 1500 of a graphical user interface for providing information about an executable application, according to one illustrated embodiment. Referring to FIG. 15, the screen 1500 may be an 'about' page. The screen 1500 may include a text box 1502 that lists the processes associated with this running instance of the application, for example: shell, TestModule1 and TestModule2.

Figure 16:
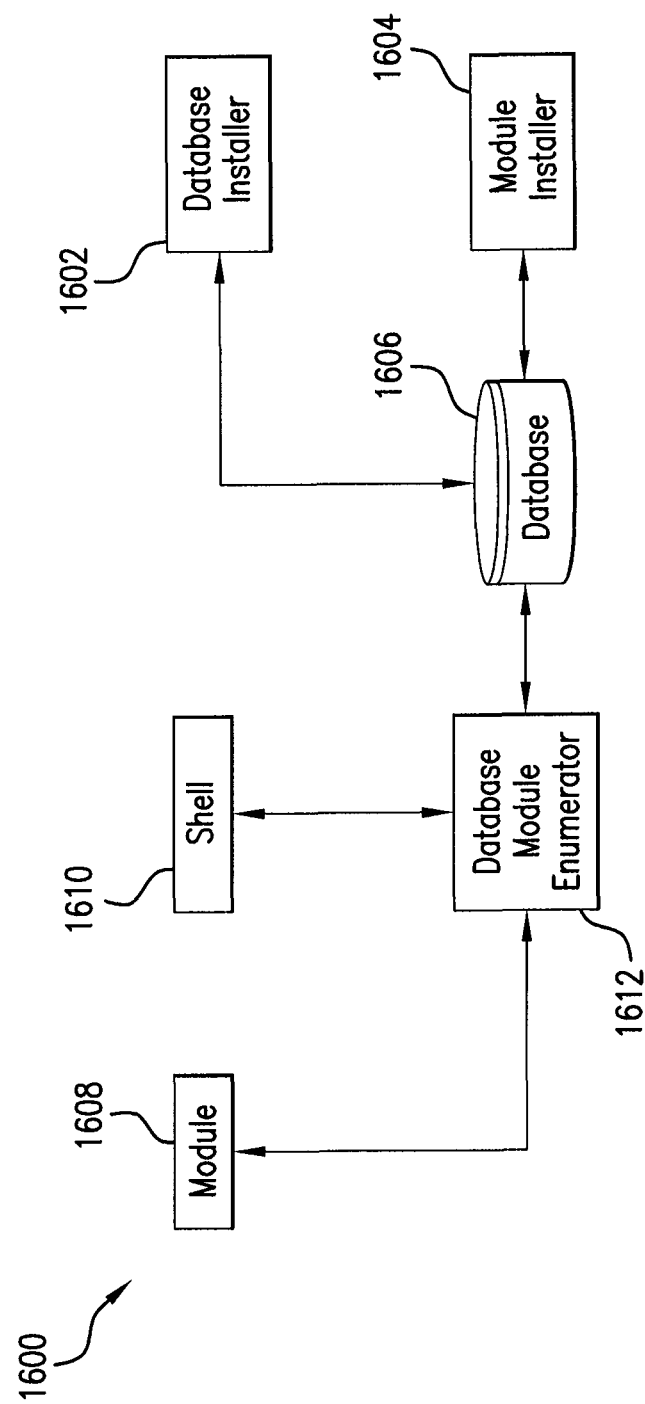
FIG. 16 is a schematic diagram of a module validation system, according to one illustrated embodiment.

FIG. 16 is a schematic diagram of a module validation system 1600. Referring to FIG. 16, the module validation system 1600 includes a database installer 1602, a module installer 1604, and a client database 1606. The database installer 1602 installs or creates the client database 1606 and/or configuration files 406 (see FIG. 4) in a storage medium. The module installer 1604 installs or stores modules 1608 in the storage medium, and the installed 1608 modules may be selectively available to users.

When modules 1608 are installed (see FIG. 6), an authentic module validation indicator such as a hash code is generated by the module installer 1604 based on the assembly file of the module 1608. This authentic module validation indicator or hash is stored in the client database 1606. When the Desktop is invoked, a shell 1610 accesses a database module enumerator 1612 to retrieve a list of modules 1608 available for use by the user. When modules 1608 are loaded (see FIG. 7), the authentic module validation indicator or hash previously stored in the client database 1606 is retrieved from the 1606 database by the database module enumerator 1612; and a comparison module validation indicator or generated hash is generated of the module currently being considered. The authentic module validation indicator or hash retrieved from the client database 1606 is compared to the comparison module validation indicator or generated hash of the version of the module requested for installation. If the authentic module validation indicator or hash matches the comparison module validation indicator or generated hash, then the module is deemed valid and the module is installed and made available to the user. If the authentic module validation indicator or hash does not matches the comparison module validation indicator or generated hash, then the module is deemed invalid and the module is not installed.

Figure 17:
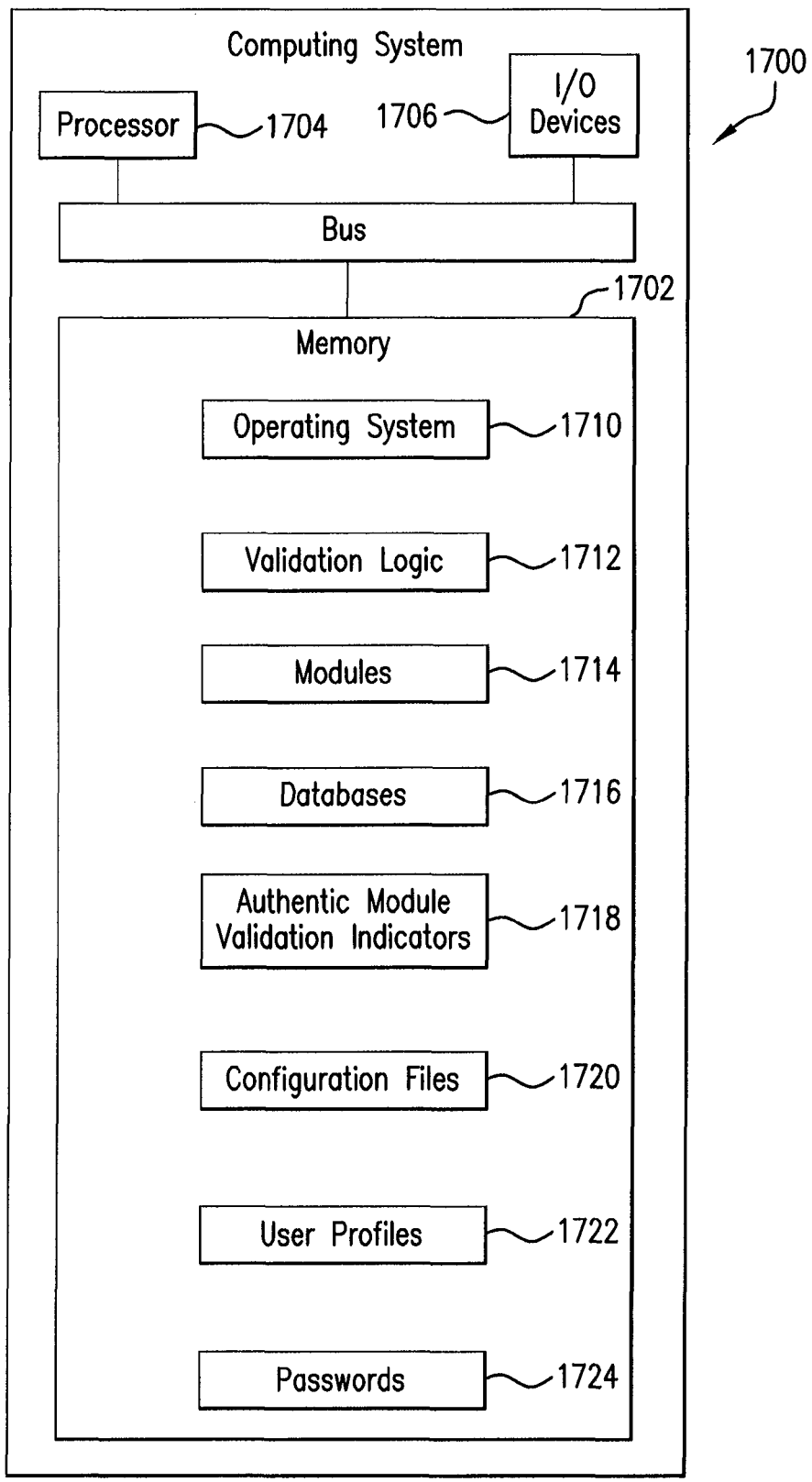
FIG. 17 is a block diagram of a computing system, according to one illustrated embodiment.

Referring to FIG. 17, a block diagram of a computing system 1700 is shown, according to one illustrated embodiment. The computing system 1700 may include, among other things, a memory 1702, a processor 1704, and input/output (I/O) devices 1706, which are connected by a bus 1708.

The memory 1702 may include, among other things, any one or combination of volatile memory elements such as a read-only memory (ROM) and a random access memory (RAM). The random access memory (RAM) may include dynamic random-access memory (DRAM), static random-access memory (SRAM), synchronous dynamic random-access memory (SDRAM), flash RAM, etc.

The memory 1702 may store one or more logic modules or logic routines, each of which may comprise an ordered listing of executable instructions for implementing logical functions. In particular, the memory 1702 stores an operating system 1710 and, among other things, software such as module validation logic 1712 and modules 1714 such as a Desktop Module, for example Bally Desktop, with a user interface (UI) and Enterprise Environment module. The execution of the operating system 1710 by the processor 1704 essentially controls the execution of other logic, such as the desktop application software and provides scheduling, input-output control, file and data management, memory management, and communication control and related services.

The memory 1702 may also store databases 1716 of various ones of the modules 1714, authentic module validation indicators 1718, configuration files, 1720, user profiles 1722, and a respective password 1724 for one or more users of the computing system 1700. A user's password 1724 and/or user profile may be used in determining which ones of the modules 1714 the user is authorized to access or use. A user's password may also be employed in opening a connection to a respective module or modules 1714.

The processor 1704 may be a device for executing software, particularly that stored in the memory 1702. The processor may be a custom made or commercially available processor, a central processing unit (CPU), a semiconductor based microprocessor (in the form of a microchip or chip set), or generally any device for executing software instructions.

In some embodiments, the processor 1704 may execute one or more of the modules 1714 to provide a user of the computing system 1700 with a user interface such as a graphical user interface. One or more of the modules 1714 may be loaded into a shell that provides the user interface. In some embodiments, the processor 1704 may execute the validation logic 1712 at a time before loading a respective module 1714 into a shell such as, but not limited to, during bootup of the computing system 1700, during a login procedure, and/or during an initialization period of an application or module.

The I/O devices 1706 include, among other things, a computer mouse, keyboard, input pad, display devices, touch screens, and speakers.

While the example embodiments have been described with relation to a gaming environment, it will be appreciated that the above concepts can also be applied to any system in which modules and/or plugins are installed at run-time in an executable application.

The foregoing description, for purposes of explanation, uses specific nomenclature and formula to provide a thorough understanding of the embodiments of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The invention claimed is:

1. In a networked gaming environment, a computer implemented method of providing security to a workstation having a processor and a processor-readable storage medium with a plurality of modules stored therein, the plurality of modules consisting of a first number (N, where 1<N) of modules, the method comprising:

executing a user-interface application with the processor of the workstation, the user-interface application being stored in the storage medium and having an application shell for a second number (M, where 1<M≦N) of modules, the second number of modules consisting of a number of the first number of modules of the plurality of modules, and the application shell providing a desktop window on a display device; and for each one of the second number of modules,
retrieving a respective module of the second number of modules from the storage medium and a corresponding respective authentic module validation indicator from a database of the user-interface application, the database stored in the storage medium,
calculating a respective comparison module validation indicator based at least on the retrieved respective module,
comparing the respective comparison module validation indicator with the respective authentic module validation indicator, and
loading the respective retrieved module in the application shell only if the respective comparison module validation indicator and the respective authentic module validation indicator are the same.

2. The method of claim 1, further comprising:
determining whether a first user is authorized for a respective module of the plurality of modules; and
preventing the respective module from being loaded in the application shell if the first user is not authorized for the respective module.

3. The method of claim 2 wherein determining whether the first user is authorized for a respective module of the plurality of modules further includes:
receiving authentication information indicative of whether the first user is or is not authorized for the respective module from a remote server; and
determining whether the first user is or is not authorized based at least on the received authentication information.

4. The method of claim 2, further comprising:
retrieving a respective user profile from a plurality of user profiles stored in the storage medium of the workstation, the plurality of user profiles including a respective user profile of the first user and at least a respective profile of at least a second user; and
determining whether the first user is authorized for a respective module of the plurality of modules based at least on the respective profile of the first user.

5. The method of claim 4, further comprising:
prior to retrieving a corresponding respective authentic module validation indicator,
decrypting a first password stored in the storage medium, and
opening a first connection to the database from which the respective authentic module validation indicator is retrieved based at least on the first password.

6. The method of claim 5, further comprising:
associating a first password with the first user;
encrypting the first password; and
storing the encrypted first password in the storage medium, wherein the encrypted first password stored in the storage medium is one of a plurality of encrypted passwords, the plurality of encrypted passwords including a second encrypted password being associated with the at least second user.

7. The method of claim 5, further comprising:
determining whether the second user is authorized for a respective module of the plurality of modules based at least on the respective profile of the second user.

8. The method of claim 7, further comprising:
prior to retrieving a corresponding respective authentic module validation indicator,
decrypting a second password stored in the storage medium, and
opening a second connection to the database from which the respective authentic module validation indicator is retrieved based at least on the second password.

9. A networked gaming system, comprising:
a network;
a plurality of gaming machines coupled to the network; and
a workstation communicatively coupled to the plurality of gaming machines via the network, the workstation comprising at least one processor and at least one processor-readable storage medium that stores a user-interface application having an application shell, a plurality of modules for the application shell, the plurality of modules consisting of a first number (N, where 1<N) of modules, and instructions that cause the at least one processor to provide a respective graphical user interface, by:
initializing the application shell for a second number (M, where 1<M≦N) of modules in response to input from a respective user of the plurality of users, the second number of modules consisting of a number of the first number of modules of the plurality of modules; and
for each respective module of the second number of modules,
determining whether a respective user of the plurality of users is authorized for the respective module of the second number of modules,
determining whether the respective module of the second number of modules is valid, and
loading the respective module in the application shell only if both the respective module is valid and the respective user is authorized for the respective module.

10. The networked gaming system of claim 9 wherein the at least one processor-readable storage medium stores instructions that cause the at least one processor to provide a respective graphical user interface, wherein determining whether the respective module of the second number of modules is valid includes
retrieving the respective module of the second number of modules from the storage medium and a corresponding respective authentic module validation indicator from a database of the user-interface application, the database stored in the storage medium;
calculating a respective comparison module validation indicator based at least on the retrieved respective module; and comparing the comparison module validation indicator with the authentic module validation indicator, wherein the respective module is valid only if the comparison module validation indicator and the authentic module validation indicator are the same.

11. The networked gaming system of claim 10 wherein the at least one processor-readable storage medium stores instructions that cause the at least one processor to provide a respective graphical user interface, wherein determining whether a respective user of the plurality of users is authorized for the respective module of the second number of modules includes, receiving authentication information indicative of whether the respective user is or is not authorized for the respective module from a remote server; and determining whether the first user is or is not authorized based at least on the received authentication information.

12. The networked gaming system of claim 11 wherein the at least one processor-readable storage medium stores instructions that cause the at least one processor to provide a respective graphical user interface, further by:

retrieving a respective user profile from a plurality of user profiles stored in the storage medium of the workstation; and determining whether the respective user is authorized for a respective module of the plurality of modules based at least on the respective profile of the respective user.

13. The networked gaming system of claim 11 wherein the at least one processor-readable storage medium stores instructions that cause the at least one processor to provide a respective graphical user interface, further by:

decrypting a password stored in the storage medium and associated with the respective user; and opening a connection to the database from which the respective authentic module validation indicator is retrieved based at least on the password.

14. The networked gaming system of claim 13 wherein the at least one processor-readable storage medium stores instructions that cause the at least one processor to provide a respective graphical user interface, further by:

associating the password with the respective user;

encrypting the password; and storing the encrypted password in the storage medium, wherein the encrypted password stored in the storage medium is one of a plurality of encrypted passwords, each one of the encrypted passwords being associated with another respective user.

15. A module validation system that validates modules used by a shell application providing a graphical user interface, comprising:

a processor-readable storage medium having a database and a plurality of modules stored therein and at least one client database having a respective authentic module validation indicator associated with a respective module included therewith; and a database module enumerator that retrieves a list of modules available for use by a respective user, and for each module in the list of modules, compares a respective comparison module validation indicator with a respective authentic module validation indicator, and loads the respective module in the shell application only if the respective comparison module validation indicator and the respective authentic module validation indicator are the same.

16. The module validation system of claim 15, further comprising:

a database installer that installs the at least one client database in the storage medium.

17. The module validation system of claim 15, further comprising:

a module installer that installs the modules in the storage medium.

18. The module validation system of claim 15 wherein the database module enumerator generates the respective comparison module validation indicator based at least on a respective corresponding module stored in the storage medium.

19. The module validation system of claim 18 wherein the database module enumerator generates the respective comparison module validation indicator based at least on a secure hash function.

* * * * *